US009612680B2

(12) United States Patent
Kies et al.

(10) Patent No.: US 9,612,680 B2
(45) Date of Patent: Apr. 4, 2017

(54) OPTIMIZING THE USE OF SENSORS TO IMPROVE PRESSURE SENSING

(71) Applicant: QUALCOMM Incorporated, San Diego, CA (US)

(72) Inventors: Jonathan Karl Kies, Encinitas, CA (US); Sherman Sebastian Antao, San Diego, CA (US); Shankar Sadasivam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 14/607,948

(22) Filed: Jan. 28, 2015

(65) Prior Publication Data

US 2016/0216824 A1    Jul. 28, 2016

(51) Int. Cl.
*G06F 3/041* (2006.01)
(52) U.S. Cl.
CPC .......... *G06F 3/0416* (2013.01); *G06F 3/0414* (2013.01); *G06F 2203/04104* (2013.01); *G06F 2203/04105* (2013.01)
(58) Field of Classification Search
CPC ......... G06F 3/0416; G06F 2203/04105; G06F 2203/04104; G06F 3/0414; G06F 3/0412
See application file for complete search history.

(56) References Cited

U.S. PATENT DOCUMENTS

| 7,847,789 | B2 | 12/2010 | Kolmykov-Zotov et al. | |
|---|---|---|---|---|
| 8,502,800 | B1 | 8/2013 | Vier | |
| 2006/0147055 | A1* | 7/2006 | Ise | H04R 3/02 381/95 |
| 2009/0012725 | A1* | 1/2009 | Vaananen | G06F 3/0414 702/41 |
| 2010/0085317 | A1* | 4/2010 | Park | G06F 1/1626 345/173 |
| 2010/0100359 | A1 | 4/2010 | Podoloff et al. | |
| 2010/0138680 | A1 | 6/2010 | Brisebois et al. | |
| 2010/0194692 | A1* | 8/2010 | Orr | G06F 3/0414 345/173 |
| 2010/0214258 | A1 | 8/2010 | Kuan | |

(Continued)

OTHER PUBLICATIONS

International Search Report and Written Opinion—PCT/US2015/066417—ISA/EPO—Apr. 15, 2016.

*Primary Examiner* — Larry Sternbane
*Assistant Examiner* — Ivelisse Martinez Quiles
(74) *Attorney, Agent, or Firm* — Weaver Austin Villeneuve & Sampson LLP

(57) ABSTRACT

Sensor data from a sensor system of a mobile device may be used for determining a level of pressure exerted by a user on the mobile device. The sensor system may include one or more types of sensors, such as a microphone and one or more inertial sensors. The inertial sensors may include one or more gyroscopes and/or accelerometers. Based on the inertial sensor data, it may be determined whether and/or how the mobile device is being held. A process for determining a level of pressure exerted by a user on the mobile device may be adapted based, at least in part, on whether and/or how the mobile device is being held. The pressure-determining process may be adapted according to various other criteria, such as a position of a touch target in a display, ambient noise levels, etc.

26 Claims, 15 Drawing Sheets

(56) References Cited

U.S. PATENT DOCUMENTS

| | | | |
|---|---|---|---|
| 2011/0216093 A1* | 9/2011 | Griffin | H04R 3/12 345/659 |
| 2013/0035139 A1* | 2/2013 | Sheynblat | G06F 1/1626 455/566 |
| 2013/0181951 A1 | 7/2013 | Klinghult et al. | |
| 2013/0257807 A1* | 10/2013 | Harris | G06F 3/0418 345/175 |
| 2013/0300668 A1* | 11/2013 | Churikov | G06F 3/041 345/168 |
| 2014/0003626 A1 | 1/2014 | Holman et al. | |
| 2014/0168117 A1 | 6/2014 | Kim et al. | |
| 2015/0015378 A1 | 1/2015 | Aliakseyeu et al. | |

\* cited by examiner

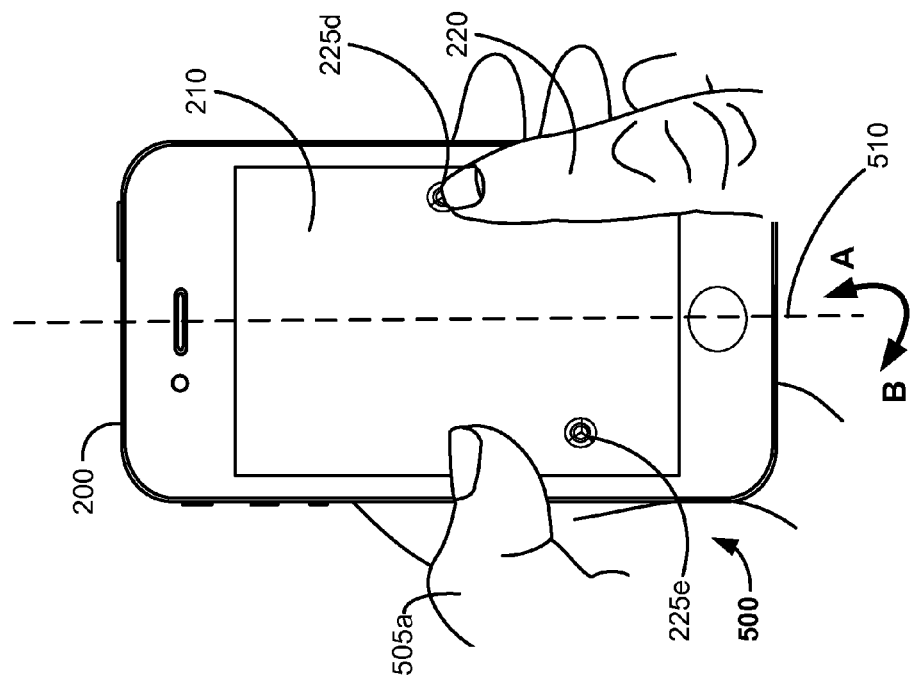
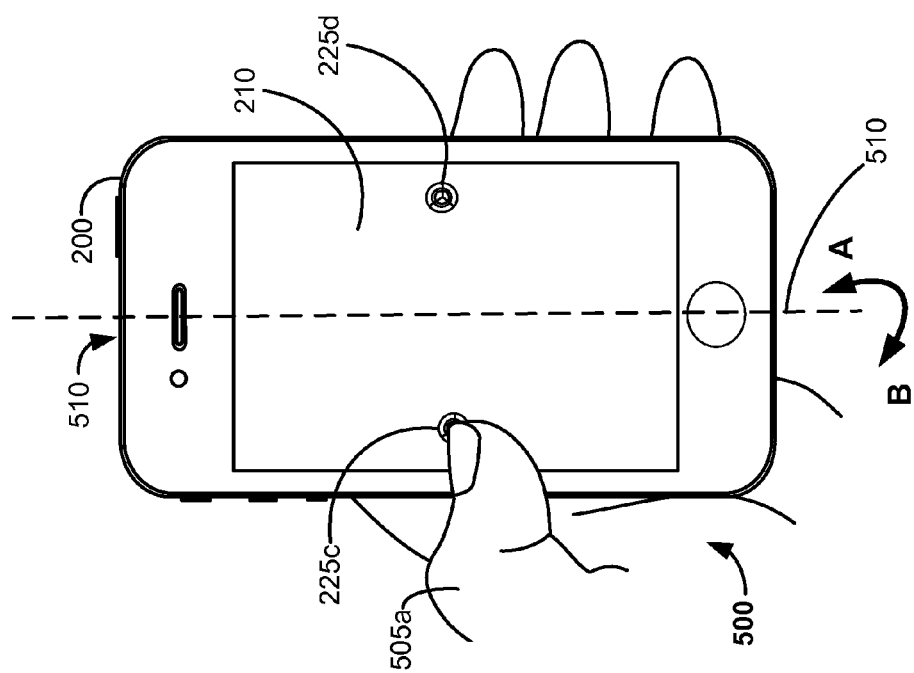

OPTIMIZING THE USE OF SENSORS TO IMPROVE PRESSURE SENSING

TECHNICAL FIELD

This disclosure relates generally to sensing devices and methods, particularly sensing devices and methods applicable to mobile devices.

DESCRIPTION OF THE RELATED TECHNOLOGY

Touch sensor devices, such as touch screens, are widely deployed on consumer electronic devices, such as mobile devices. However, touch screens are not typically able to determine the pressure of a user's touch, other than simply a binary (on/off-touch/no-touch) determination. It would be desirable to desirable to develop methods for determining a level of pressure exerted by a user on a display glass (or other surfaces) of a mobile device.

SUMMARY

The systems, methods and devices of the disclosure each have several innovative aspects, no single one of which is solely responsible for the desirable attributes disclosed herein.

One innovative aspect of the subject matter described in this disclosure can be implemented in a method that involves adapting a pressure-determining process according to input from one or more sensors of a mobile device. In some implementations, the method may involve receiving sensor data from the one or more sensors of the mobile device. The sensor data may include inertial sensor data. The method may involve determining, based on the inertial sensor data, whether the mobile device is being held by a user. In some examples, the mobile device may include a touch sensor system. In some such examples, determining whether the mobile device is being held by the user may be based, at least in part, on input from the touch sensor system.

In some examples, the method may involve adapting a pressure-determining process for determining a level of pressure exerted by the user on the mobile device. The adapting process may be based, at least in part, on whether the mobile device is being held by the user. The method may involve performing the pressure-determining process according to the sensor data and an adapted pressure-determining process.

In some implementations, the sensor data may include audio data from a microphone. The pressure-determining process may be based, at least in part, on the audio data. In some examples, the audio data may include voice data and finger tap data. The method may involve applying a scheduling mechanism for the voice data and the finger tap data.

In some examples, adapting the pressure-determining process may involve applying at least one weighting factor to sensor data from one or more sensors. The method may involve determining an ambient noise level. The weighting factor or factors may be based, at least in part, on the ambient noise level.

In some implementations, when it is determined that the mobile device is being held by the user, the method may involve displaying a touch target in a touch target location of a mobile device display and adapting the determination of the adapting the pressure-determining process according to the touch target location.

Some implementations may involve determining how the mobile device is being held. Adapting the pressure-determining process may be based, at least in part, on how the mobile device is being held. Some such examples may involve determining whether the mobile device is being held in a single hand or in both hands. In some such examples, the method may involve determining a mobile device orientation. Some methods that involve adapting the pressure-determining process according to the location of the touch target may involve adapting the pressure-determining process, at least in part, according to the mobile device orientation. Some such methods may involve determining whether the mobile device is in a portrait or a landscape orientation and adapting the pressure-determining process based, at least in part, on whether the mobile device is in a portrait or a landscape orientation.

According to some examples, the method may involve determining user touch patterns. For example, determining the user touch patterns may involve determining soft press and hard press value ranges for the user. In some implementations, determining the user touch patterns may involve determining first value ranges when the mobile device is being held by the user and determining second value ranges when the mobile device is not being held by the user. Adapting the pressure-determining process may be based, at least in part, on the user touch patterns.

In some instances it may be determined that the mobile device is not being held by the user. In some such examples, it may be determined that the mobile device is resting on a stable surface while being operated. Adapting the pressure-determining process may be based, at least in part, on a characteristic movement corresponding with a structure of the mobile device or a structure of a mobile device case. In some implementations, when it is determined that the mobile device is not being held by the user, the method may involve causing the mobile device to prompt the user to pick up the mobile device.

Some or all of the methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, other innovative aspects of the subject matter described in this disclosure can be implemented in a non-transitory medium having software stored thereon. For example, the software may include instructions for receiving sensor data from the sensor system of the mobile device. The sensor data may include inertial sensor data. The software may include instructions for determining, based on the inertial sensor data, whether the mobile device is being held by a user and for adapting a pressure-determining process of determining a level of pressure exerted by the user on the mobile device based, at least in part, on whether the mobile device is being held by the user. The software may include instructions for performing the pressure-determining process according to the sensor data and an adapted pressure-determining process.

In some examples, the sensor data may include audio data from a microphone. Adapting the pressure-determining process may involve applying at least one weighting factor to the audio data, to the inertial sensor data or to both the audio data and the inertial sensor data.

In some instances, it may be determined that the mobile device is being held by the user. In some examples, the software may include instructions for determining how the mobile device is being held and for adapting the pressure-determining process may be based, at least in part, on how the mobile device is being held. In some such implementations, the software may include instructions for determining a mobile device orientation and for adapting the pressure-determining process based, at least in part, on the mobile device orientation. According to some such examples, the software may include instructions for displaying a touch target in a location of a mobile device display and for adapting the pressure-determining process according to the location of the touch target on the display. Adapting the pressure-determining process according to the location of the touch target may be based, at least in part, on the mobile device orientation.

Some innovative aspects of the subject matter described in this disclosure can be implemented in a mobile device that includes a sensor system and a control system. The sensor system may include a plurality of sensors and may include at least one inertial sensor. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system also may include (and/or be configured for communication with) one or more memory devices, such as one or more random access memory (RAM) devices, read-only memory (ROM) devices, etc.

In some implementations, the control system may be capable of receiving sensor data from the sensor system. The sensor data may include inertial sensor data. The control system may be capable of determining, based on the inertial sensor data, whether the mobile device is being held by a user. The control system may be capable of adapting a pressure-determining process based, at least in part, on whether the mobile device is being held by the user. The control system may be capable of performing the pressure-determining process according to the sensor data and an adapted pressure-determining process.

According to some examples, the sensor system may include a microphone and the sensor data may include audio data from the microphone. The pressure-determining process may be based, at least in part, on the audio data. In some implementations, adapting the pressure-determining process may involve applying at least one weighting factor to the audio data and/or to the inertial sensor data.

In some examples, the sensor system may include a touch sensor system and the mobile device may include a display. According to some such examples, the control system may be further capable of displaying a touch target in a location of the display, of determining, according to input from the touch sensor system, that a user has touched the touch target and of adapting the pressure-determining process based, at least in part, on the location of the touch target on the display. In some such implementations, the control system may be further capable of determining a mobile device orientation. Adapting the pressure-determining process according to the location of the touch target may be based, at least in part, on the mobile device orientation.

According to some implementations, the control system may be further capable of determining user touch patterns. Adapting the pressure-determining process may be based, at least in part, on the user touch patterns.

In some instances, the control system may determine that the mobile device is being held by the user. According to some examples, the control system may be capable of determining how the mobile device is being held. For example, the control system may be capable of determining a mobile device orientation. In some implementations, the control system may be capable of determining whether the mobile device is being held in a single hand or in two hands. The control system may be capable of adapting the pressure-determining process based, at least in part, on how the mobile device is being held.

In some instances, the control system may determine that the mobile device is not being held by the user. In some implementations, the control system may be capable of causing the mobile device to prompt the user to pick up the mobile device.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 5A-5C show examples of user touches on a mobile device while the mobile device is being held in a single hand.

DETAILED DESCRIPTION

Figure 1:
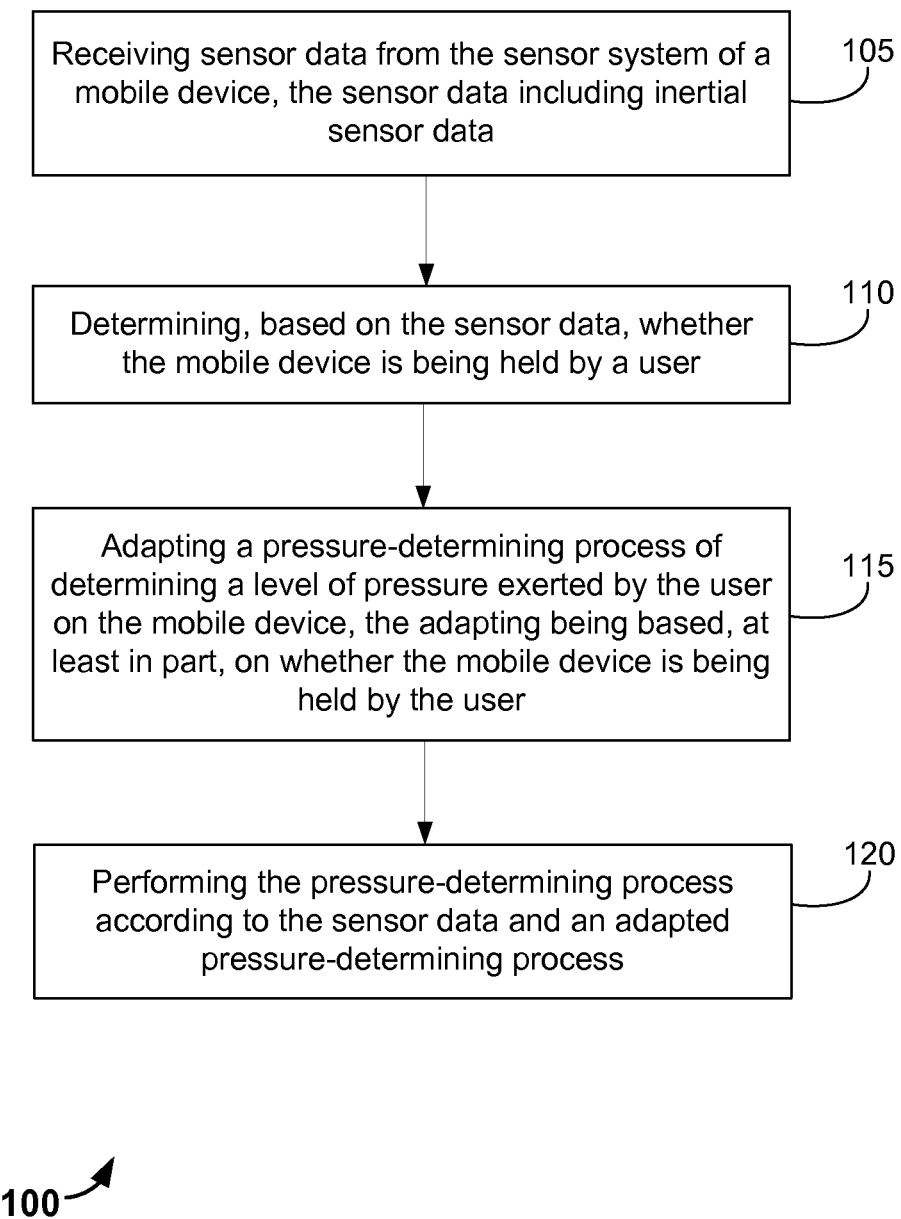
FIG. 1 is a flow diagram that outlines one example of a method of determining levels of pressure that are being applied to a mobile device.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a touch sensing system. In addition, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, global positioning system (GPS) receivers/navigators, digital media players (such as MP3 players), wrist watches, clocks, electronic reading devices (e.g., e-readers), mobile health devices, computer monitors. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some implementations described herein use sensor data from a sensor system of a mobile device for determining a level of pressure exerted by a user on the mobile device. The sensor system may include one or more types of sensors, such as a microphone and one or more inertial sensors. The inertial sensors may include one or more gyroscopes and/or accelerometers. Some implementations may involve determining, based on the inertial sensor data, whether and/or how the mobile device is being held. A process for determining a level of pressure exerted by a user on the mobile device may be adapted based, at least in part, on whether and/or how the mobile device is being held by the user. In some examples, the pressure-determining process may be adapted according to a position of a touch target in a display, ambient noise levels, etc. The adapting process may involve applying weighting factors to one or more types of sensor data.

Particular implementations of the subject matter described in this disclosure can be implemented to realize one or more of the following potential advantages. Some implementations provide pressure-sensing functionality without requiring additional sensors, such as dedicated pressure sensors, to be deployed in a mobile device, other than the sensors that are typically included with such devices. Instead, sensor data from the normally-provided inertial sensors and/or microphone(s) may be used to determine the pressure of a user's touch. Some implementations may be capable of determining the degree of pressure applied at a point in time and/or the change in pressure applied over a period of time.

In some implementations, a process for determining pressure may be tuned or adapted according to how (or whether) a mobile device is being held. The movement induced by a hard press when a mobile device is held in the user's hand may be quite different than movement induced by a hard press when the device is resting on a stable surface, such as a table top or a desk top. Some implementations may involve adapting a process for determining pressure according to whether a mobile device is being held in a single hand or in two hands. Alternatively, or additionally, some implementations may involve adapting a process for determining pressure according to a location of a user's touch and/or which digit or digits are being used for the touch. Accordingly, various implementations disclosed herein are based, at least in part, on a determination of whether and/or how the mobile device is being held by the user.

FIG. 1 is a flow diagram that outlines one example of a method of determining levels of pressure that are being applied to a mobile device. The blocks of method 100, like other methods described herein, are not necessarily performed in the order indicated. Moreover, such methods may include more or fewer blocks than shown and/or described.

In this implementation, block 105 involves receiving sensor data from the sensor system of a mobile device. In some such implementations, block 105 may involve the receipt of sensor data by a control system of the mobile device. In this example, the sensor data includes inertial sensor data. The inertial sensor data may include gyroscope data and/or accelerometer data from gyroscopes and/or accelerometers of the sensor system. In some implementations, the sensor data may include audio data from one or more microphones of the mobile device.

Here, block 110 involves determining, based on the sensor data, whether the mobile device is being held by a user. As described in more detail below, there may be various potential indications, according to the sensor data, as to whether or not a mobile device is being held. For example, if the mobile device is lying on a stable surface a user's touch will generally not cause as much rotation, acceleration, etc., as compared to the motion that would be cause by the same touch if the mobile device were being held by the user. The rotation, acceleration, etc., may be detected by inertial sensors of the mobile device.

Block 110 may, for example, involve determining the amplitudes of acceleration along one or more axes of the mobile device, determining the amount of rotation and/or angular velocity of rotation around one or more axes of the mobile device, etc. These and/or other types of inertial sensor data may be evaluated, e.g., by reference to inertial sensor data stored in one or more look-up tables or other data structures. For example, block 110 may involve determining whether one or more types of displacement, acceleration, rotation, etc., exceed stored threshold values corresponding to use of the mobile device while the mobile device is resting on a stable surface.

In this example, block 115 involves adapting a pressure-determining process of determining a level of pressure exerted by the user on the mobile device. Various examples of adapting the pressure-determining process are disclosed herein. In this implementation, adapting the pressure-determining process is based, at least in part, on whether the mobile device is being held by the user. As described in detail below, adapting the pressure-determining process may be based on other factors, such as how the mobile device is being held, ambient noise levels, a characteristic movement corresponding with a structure of the mobile device or a structure of a mobile device case, etc.

In this example, block 120 involves performing the pressure-determining process according to the sensor data and an adapted pressure-determining process. Block 120 may, for example, involve evaluating displacement, acceleration, rotation, etc., corresponding to the received inertial sensor data. In some implementations, block 120 may involve evaluating raw inertial sensor data, such as raw accelerometer data and/or raw gyroscope data. Alternatively, or additionally, block 120 may involve processing inertial sensor data and evaluating the resulting processed inertial sensor data. In some such implementations, block 120 may involve determining and evaluating the rate of change of the raw inertial sensor data, such as the slope, gradient, etc. Alternatively, or additionally, block 120 may involve determining a mean of raw inertial sensor values and evaluating the rate of change of the mean inertial sensor data values. For example, a mean value of inertial sensor data corresponding to touches in the same area of the mobile device may be determined.

In some examples, block 120 may involve applying a weighting function to one or more types of inertial sensor data. In some use cases, for example, accelerometer data may indicate more of the movement variation of a mobile device than gyroscope data. In some such examples, a touch target location may be at least one basis for inertial sensor data weighting functions. When pressing on a target near the middle of a mobile device screen, for example, gyroscope data may account for less of the resulting movement than accelerometer data. Therefore, some implementations may involve weighting gyroscope data relatively less than accelerometer data when a user is touching a target near the middle of a mobile device screen. Pressing on the corner areas of the mobile device screen may result in relatively more rotation. Accordingly, some implementations may involve weighting gyroscope data relatively more than accelerometer data when a user is touching targets in the corner areas.

Such inertial sensor data weighting factors also may depend, at least in part, on how a mobile device is being held. For example, if a user presses on a target near the middle of a mobile device screen when the mobile device is being held in a stable position (e.g., cradled securely against the user's torso), gyroscope data may account for relatively less of the resulting movement than accelerometer data. If a user is holding the mobile device away from the user's body (for example, if the mobile device is executing an augmented reality software application), one might expect a gyroscope to detect relatively more rotational movement than in a texting use case in which the user is holding the mobile device closer to the body.

Alternatively, or additionally, block 120 also may involve evaluating audio data from one or more microphones of the mobile device. User touches (such as finger taps) that produce louder sounds, corresponding to higher-amplitude audio data, may be interpreted as producing a higher level of pressure on the mobile device. In some examples, evaluating the audio data takes into account the relative distance from a touch location to the microphone of the mobile device that provided the audio data. The touch location may be determined according to input from a touch sensor system, which may include a touch screen.

In some implementations, block 120 may involve invoking one or more models, scenarios and/or algorithms for pressure determination, according to how the pressure-determining process has been adapted in block 114. For the sake of brevity, such models, scenarios and/or algorithms may be referred to herein as "scenarios."

For example, the scenarios for pressure determination may indicate whether, and if so how, raw inertial data will be processed. In some implementations, the scenarios for pressure determination may involve an indication of which look-up table(s) or other data structure(s) to access for reference values to be used during the pressure-determination process. The reference values may, for example, be sensor data values corresponding to varying levels of pressure being applied to the mobile device. As described elsewhere herein, in some implementations the reference values may differ according to whether and/or how the mobile device is being held while a user is interacting with the mobile device.

The models, scenarios and/or algorithms may, for example, be implemented according to instructions, such as computer software, stored on one or more non-transitory media. The one or more non-transitory media may correspond with a portion of a memory system of the mobile device. Alternatively, or additionally, at least some of the related software may be stored in a memory system of another device that the mobile device may be capable of accessing, e.g., via a data network. The instructions may be executed by a control system of the mobile device.

The scenarios also may indicate whether audio data will be part of the pressure-determination process. If so, the scenarios may include instructions as to how the audio data will be processed, whether inertial data also will be evaluated, whether to apply a weighting factor between different types of inertial sensor data, whether to apply a weighting factor between pressure-determination results based on the audio data and pressure-determination results based on the inertial sensor data, etc.

For implementations that involve using audio data from a mobile device microphone as a basis for the pressure-determination process, there may be situations in which the microphone is used for other features, such as an "always on" voice control feature. If such a feature is enabled, some implementations may provide a scheduling mechanism so that the microphone can be listening to both target sounds (voice and finger tapping) according to an interleaved schedule (e.g., voice data, finger tap data, voice data, finger tap data, etc.) In some implementations, the schedule may include different time intervals (e.g., voice data 10 ms, finger tap data 5 ms, voice data 10 ms, finger tap data 5 ms, etc.). Some examples may involve extending a scheduled "voice data" time interval if a voice command is detected.

Alternatively, or additionally, method 100 may involve other pressure-determining processes. In some implementations, method 100 (or another method disclosed herein) may involve receiving touch screen data from a touch screen of the mobile device and performing a pressure-determining process that is based, at least in part, on the touch screen data. For example, the pressure-determining process may involve determining a number of touch screen elements that are responding to a touch, determining an area of the touch screen corresponding to the touch and/or determining the magnitudes of capacitance (or other measured indicia) detected by touch screen elements. A relatively larger number of touch screen elements that are responding to a touch, a relatively larger area of the touch screen corresponding to the touch and/or relatively larger magnitudes of capacitance (or other measured indicia) detected by touch screen elements may indicate a larger applied force and/or pressure.

Figure 2:
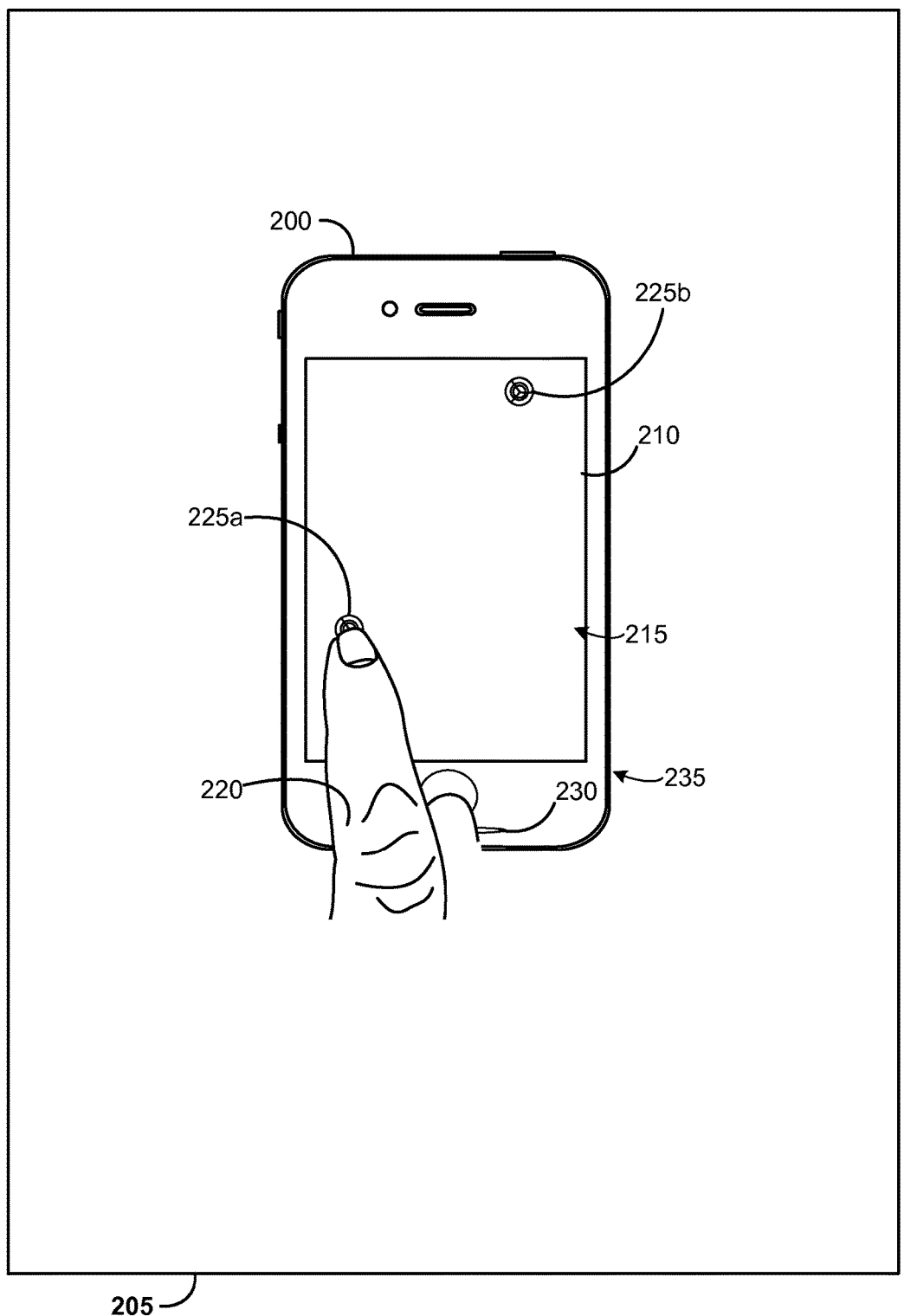
FIG. 2 shows an example of a mobile device resting on a stable surface while being operated.

FIG. 2 shows an example of a mobile device resting on a stable surface while being operated. In this example, the mobile device 200 is resting on a table 205, only a portion of which is shown in FIG. 2. The mobile device 200 includes a display 210 and a touch screen 215 of a touch sensor system. The mobile device 200 also includes a sensor system and a control system, examples of which are disclosed elsewhere herein.

In FIG. 2, a user's finger 220 is shown touching a touch target 225a that is presented on the display 210. In this example, a back portion of the mobile device 200 that is resting on the table 205 is relatively flat. Therefore, the mobile device does not move a great deal in response to the user's touch. Accordingly, the inertial sensor data corresponding to this touch may be relatively low-amplitude and may not provide much useful information regarding the pressure of a user's touch. If the user were to touch the touch target 225b, the mobile device would still not move a great deal and the inertial sensor data corresponding to this touch would also be relatively low-amplitude. In such examples, audio data corresponding to the touch may be detected by the microphone 230 and may be relatively more useful than inertial sensor data for pressure determination.

However, if the mobile device 200 were being held in the user's hand while the user's finger 220 were touching the touch target 225a, the mobile device 200 may be displaced, accelerate and/or rotate relatively more than when mobile device is resting on a stable surface while being operated. If the mobile device 200 were being held in the user's hand while the user's finger 220 were touching the touch target 225b, the mobile device 200 would also move relatively more than if mobile device were resting on a stable surface. The amount of motion caused by a user's touch may depend not only on the touch target location, but may also depend on how the mobile device is being held. For example, if the mobile device 200 were being held near the bottom portion 235, the mobile device 200 may move relatively more when the user's finger 220 is touching the touch target 225b than when the user's finger 220 is touching the touch target 225a. Accordingly, inertial sensor data may be quite useful for pressure determination when the mobile device 200 is being held in a user's hand.

Different sets of reference values may be used in the pressure-determination process, depending on whether the mobile device is resting on a stable surface while being operated, whether the mobile device is being held by the user when operated, etc. For example, the reference values corresponding to scenarios to be used when the mobile device is resting on a stable surface while being operated may indicate relatively lower inertial sensor threshold values for a level of pressure, whereas the reference values corresponding to scenarios to be used when the mobile device is being held by the user when operated may indicate relatively higher inertial sensor threshold values for the same level of pressure.

Figure 3:
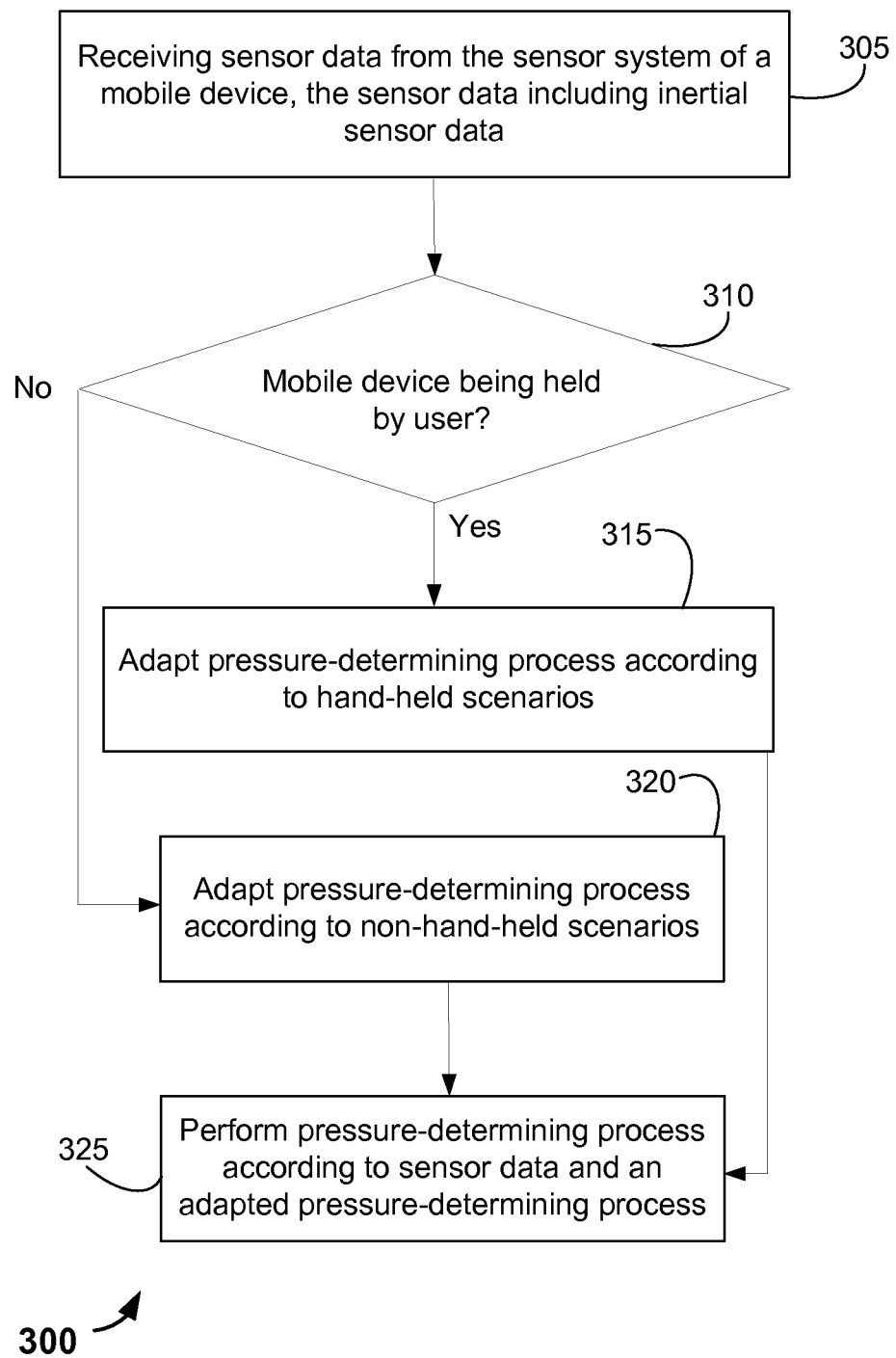
FIG. 3 is a flow diagram that outlines an example of adapting a pressure-determining process.

FIG. 3 is a flow diagram that outlines an example of adapting a pressure-determining process. The blocks of method 300 are not necessarily performed in the order indicated and may include more or fewer blocks than shown and/or described. In this implementation, block 305 involves receiving inertial sensor data from the sensor system of a mobile device, the sensor data including inertial sensor data. Block 305 may be performed substantially as block 105, described above, is performed.

Block 310 may be performed in a manner similar to that of block 110, described above. However, in this example, if it is determined in block 310 that the mobile device is being held by the user, the process continues to block 315, which involves adapting the pressure-determining process according to one or more hand-held scenarios.

The hand-held scenarios may, for example, include instructions for processing and/or evaluating inertial sensor data as part of the pressure-determining process. The hand-held scenarios may include instructions for accessing stored inertial sensor reference values in a look-up table or other data structure corresponding to hand-held use of the mobile device, for comparing the stored inertial sensor reference values with received inertial sensor values, and for determining the pressure applied to the mobile device according to the comparison. As noted above, the reference values corresponding to hand-held scenarios may indicate relatively higher inertial sensor threshold values, as compared to the reference values corresponding to non-hand-held scenarios, for the same level of pressure.

In some implementations, hand-held scenarios may include instructions for taking into account a touch target location during the pressure-determining process. For example, some such implementations may involve displaying a touch target in a touch target location of a mobile device display and adapting the pressure-determining process according to the touch target location.

Some implementations involve adapting the pressure-determining process according to the touch target location and according to how the mobile device is being held. For example, in the example shown in FIG. 2, it was previously noted that if the mobile device 200 were being held near the bottom area 235 of the mobile device 200, a touch on the touch target 225b would generally cause a greater movement of the mobile device 200 than a touch of the same force and pressure on the touch target 225a. Accordingly, in some implementations hand-held scenarios may include instructions for adapting the pressure-determining process to compensate for touch target location and for how the mobile device is being held. Some such implementations involve an underlying assumption about how the mobile device will be held (e.g., an assumption that the mobile device will be held nearer to the top, nearer to the bottom, nearer to a particular side, etc.), whereas other implementations may involve determining how the mobile device is being held according to data received from the inertial sensor system. For example, the latter implementations may involve determining whether touches in certain areas of the mobile device are consistently correlated with relatively high inertial sensor amplitudes. If so, such implementations may involve applying a function, such as a weighting or a normalizing function, to compensate for the high inertial sensor amplitudes in these areas of the mobile device.

In this implementation, if it is determined in block 310 that the mobile device is not being held by the user, the process continues to block 320, which involves adapting the pressure-determining process according to one or more non-hand-held scenarios. The non-hand-held scenarios may, for example, include instructions for processing and/or evaluating inertial sensor data as part of the pressure-determining process. The non-hand-held scenarios may include instructions for accessing stored inertial sensor reference values in a look-up table or other data structure corresponding to non-hand-held use of the mobile device, for comparing the stored inertial sensor reference values with received inertial sensor values, and for determining the pressure applied to the mobile device according to the comparison. As noted above, the reference values corresponding to non-hand-held scenarios may indicate relatively lower inertial sensor threshold values, as compared to the reference values corresponding to hand-held scenarios, for the same level of pressure. In this example, block 325 involves performing the pressure-determining process according to received sensor data and a pressure-determining process adapted either according to one or more hand-held scenarios or non-hand-held scenarios.

Some hand-held and/or non-hand-held scenarios may involve the use of audio data. As noted above, audio data may be useful for pressure determination in non-hand-held scenarios, particularly if the ambient noise levels are relatively low. If audio data are evaluated as part of the pressure-determining process, the scenarios may, for example, include instructions for processing and/or evaluating the audio data. If a scenario also involves using inertial sensor data for the pressure-determining process, the scenario may include instructions for applying at least one weighting factor to the audio data, to the inertial sensor data or to both the audio data and the inertial sensor data. For example, some non-hand-held scenarios may include instructions for applying a higher weighting factor to the audio data than to the inertial sensor data.

In some scenarios, a weighting factor to be applied to audio data may depend, at least in part, on the ambient noise level. For example, some such scenarios may include instructions for applying a relatively lower weighting factor to the audio data when ambient noise levels are at or above a threshold level. Some non-hand-held scenarios may include instructions for processing and/or evaluating the audio data and for disregarding the inertial sensor data.

Various types of hand-held scenarios are provided herein. For example, some implementations make a distinction between situations in which a mobile device is being held in a single hand or in two hands.

Figure 4:
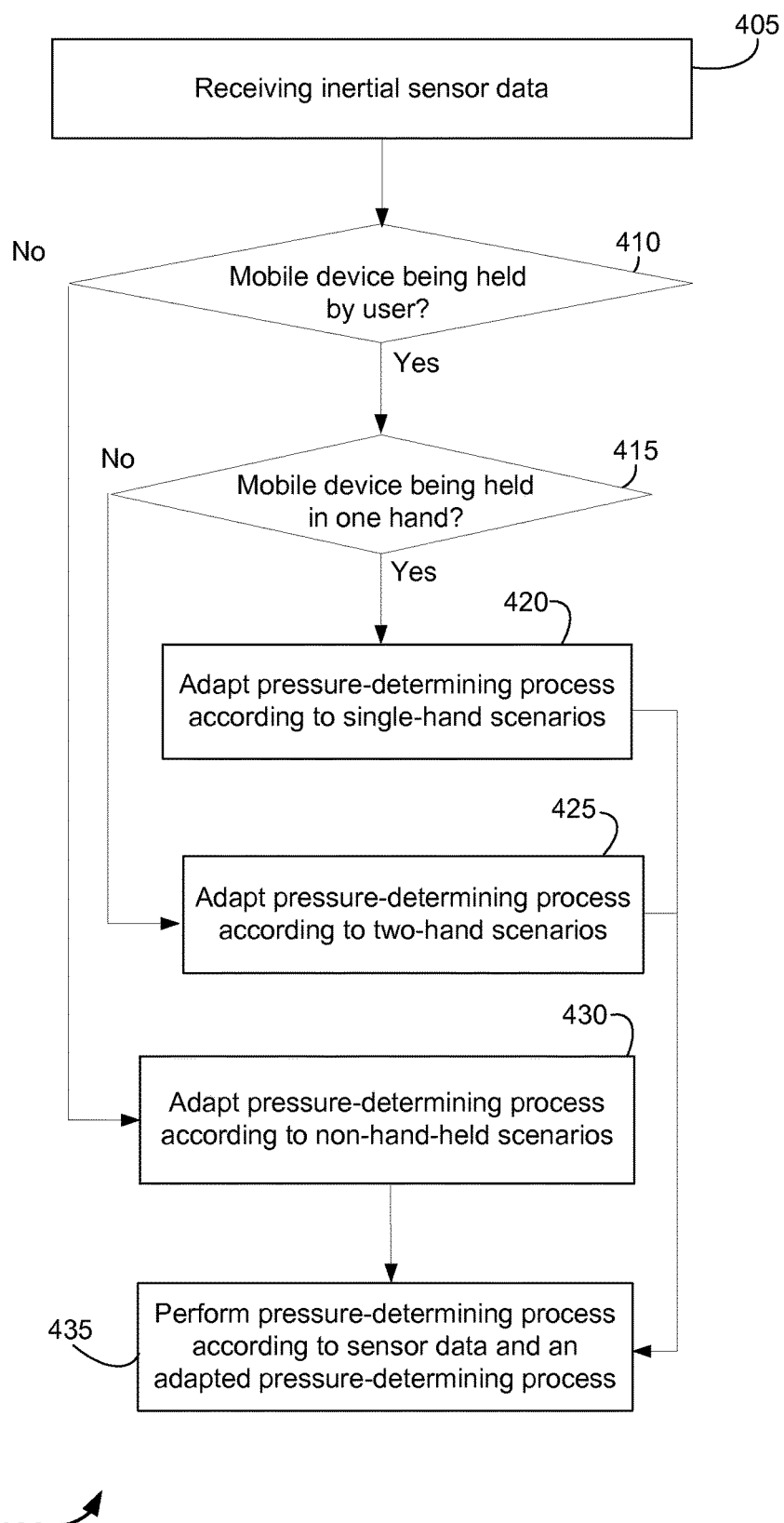
FIG. 4 is a flow diagram that outlines an alternative example of adapting a pressure-determining process.

FIG. 4 is a flow diagram that outlines an alternative example of adapting a pressure-determining process. The blocks of method 400 are not necessarily performed in the order indicated and may include more or fewer blocks than shown and/or described. In this implementation, block 405 involves receiving inertial sensor data, including inertial sensor data, from the sensor system of a mobile device. Block 405 may be performed substantially as blocks 105 and 305, described above, are performed.

Block 410 may be performed in a manner similar to that of block 310, described above with reference to FIG. 3. For example, if it is determined in block 410 that the mobile device is not being held by the user, the process continues to block 430, wherein a pressure-determining process is adapted for one or more non-hand-held scenarios.

However, in this example, if it is determined in block 410 that the mobile device is being held by the user, the process continues to block 415, in which it is determined whether the mobile device is being held in a single hand or in both hands. (In some implementations, the operations of blocks 410 and 415 may be performed at substantially the same time and/or may be part of the same process.) For example, block 415 may involve determining whether one or more types of displacement, acceleration, rotation, etc., exceed stored threshold values corresponding to use of the mobile device while the mobile device is resting on a stable surface, but are less than stored threshold values corresponding to use of the mobile device while the mobile device is held in one hand.

In this implementation, if it is determined in block 415 that the mobile device is being held in a single hand, the process continues to block 420, wherein a pressure-determining process is adapted for one or more single-hand scenarios. In some implementations, the single-hand scenario(s) may be substantially similar to, or the same as, the hand-held scenarios described above, e.g., with reference to block 315 of FIG. 3.

In this example, if it is determined in block 415 that the mobile device is not being held in a single hand, the process continues to block 425, wherein a pressure-determining process is adapted for one or more two-hand scenarios. In some implementations, the two-hand scenarios may be similar to the hand-held scenarios described above with reference to block 315. In this example, block 435 involves performing the pressure-determining process according to received sensor data and a pressure-determining process adapted either according to one or more hand-held scenarios or non-hand-held scenarios.

However, in some implementations different sets of reference values may be used in the pressure-determination process, depending on whether the mobile device is resting on a stable surface while being operated, whether the mobile device is being held in a single hand or whether the mobile device is being held in two hands when operated, etc. For example, the reference values for two-hand scenarios may be intermediate reference values, as compared to the reference values for single-hand scenarios and the reference values for non-hand-held operation. In some implementations, the reference values for two-hand scenarios may correspond to lower inertial sensor thresholds, as compared to the reference values for single-hand scenarios, for the same level of pressure. The reference values for two-hand scenarios may correspond to higher inertial sensor thresholds for the same level of pressure, as compared to the reference values for non-hand-held operation.

Figure 5C:
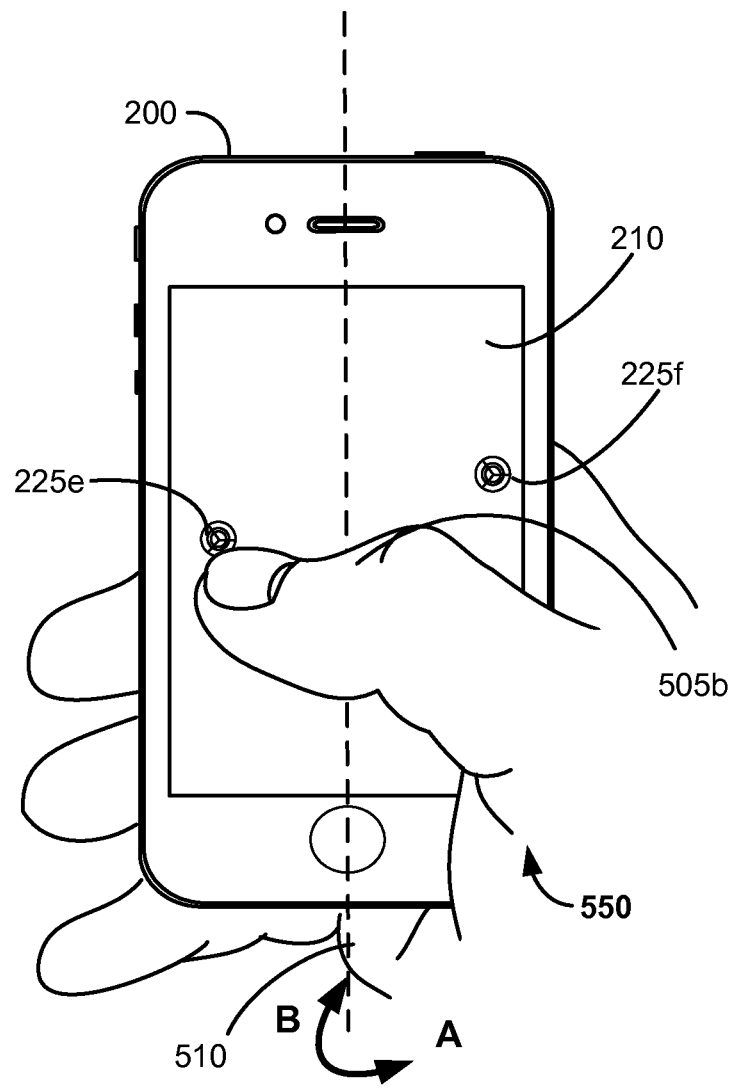

In some examples, the motions caused by a user's touch on a mobile device may differ according to whether the mobile device is being held in a right hand or a left hand. FIGS. 5A-5C show examples of user touches on a mobile device while the mobile device is being held in a single hand. In the examples shown in FIGS. 5A and 5B, the mobile device 200 is being held in a user's left hand 500, whereas in FIG. 5C the mobile device 200 is being held in a user's right hand 550.

In FIG. 5A, the user is shown touching the touch target 225c, which is being presented on a left side of the display 210, with the user's left thumb 505a. In this example, the mobile device 200 tends to rotate around vertical axis 510 in direction B (clockwise when viewed from the top side 510) when the user touches the left side of the display 210 and tends to rotate around vertical axis 510 in direction A (counterclockwise when viewed from the top side 510) when the user touches the right side of the display 210 with the user's left thumb 505a, e.g., when the user touches the touch target 225d.

FIG. 5B shows a user's finger 220 touching a touch target 225d, which is being presented on a right side of the display 210. In this example, the finger 220 is an index finger of the user's right hand. The mobile device 200 tends to rotate around vertical axis 510 in direction A when the user touches the right side of the display 210 with the finger 220. Similarly, the mobile device 200 tends to rotate around vertical axis 510 in direction B when the user touches the left side of the display 210 with the finger 220, e.g., when the user touches the touch target 225e.

In FIG. 5C, the user is shown touching the touch target 225e, which is being presented on a left side of the display 210, with the user's right thumb 505b. In this example, the mobile device 200 tends to rotate around vertical axis 510 in direction B when the user touches the left side of the display 210 and tends to rotate around vertical axis 510 in direction A when the user touches the right side of the display 210 with the user's right thumb 505b, e.g., when the user touches the touch target 225f.

However, at least in part because of the structure of the human wrist, the magnitude of rotation and/or acceleration of the mobile device 200 will tend to be greater in either direction A or direction B, depending on whether the mobile device 200 is being held in the left hand 500 or the right hand 550. For example, when the mobile device is being held in the left hand 500, the magnitude of rotation and/or acceleration of the mobile device 200 will tend to be greater in direction A. This may be true regardless of whether the user is touching the display 210 with the left thumb 505a or the right index finger. For example, assuming that the touch target 225c of FIG. 5A is the same distance from the axis 510 as the touch target 225d, the magnitude of rotation and/or acceleration of the mobile device 200 in direction A, caused by touching the touch target 225d, will nonetheless tend to be greater than the magnitude of rotation and/or acceleration of the mobile device 200 in direction B, caused by touching the touch target 225c. Accordingly, some implementations may involve determining whether a mobile device is being held in a user's right or left hand.

Figure 6:
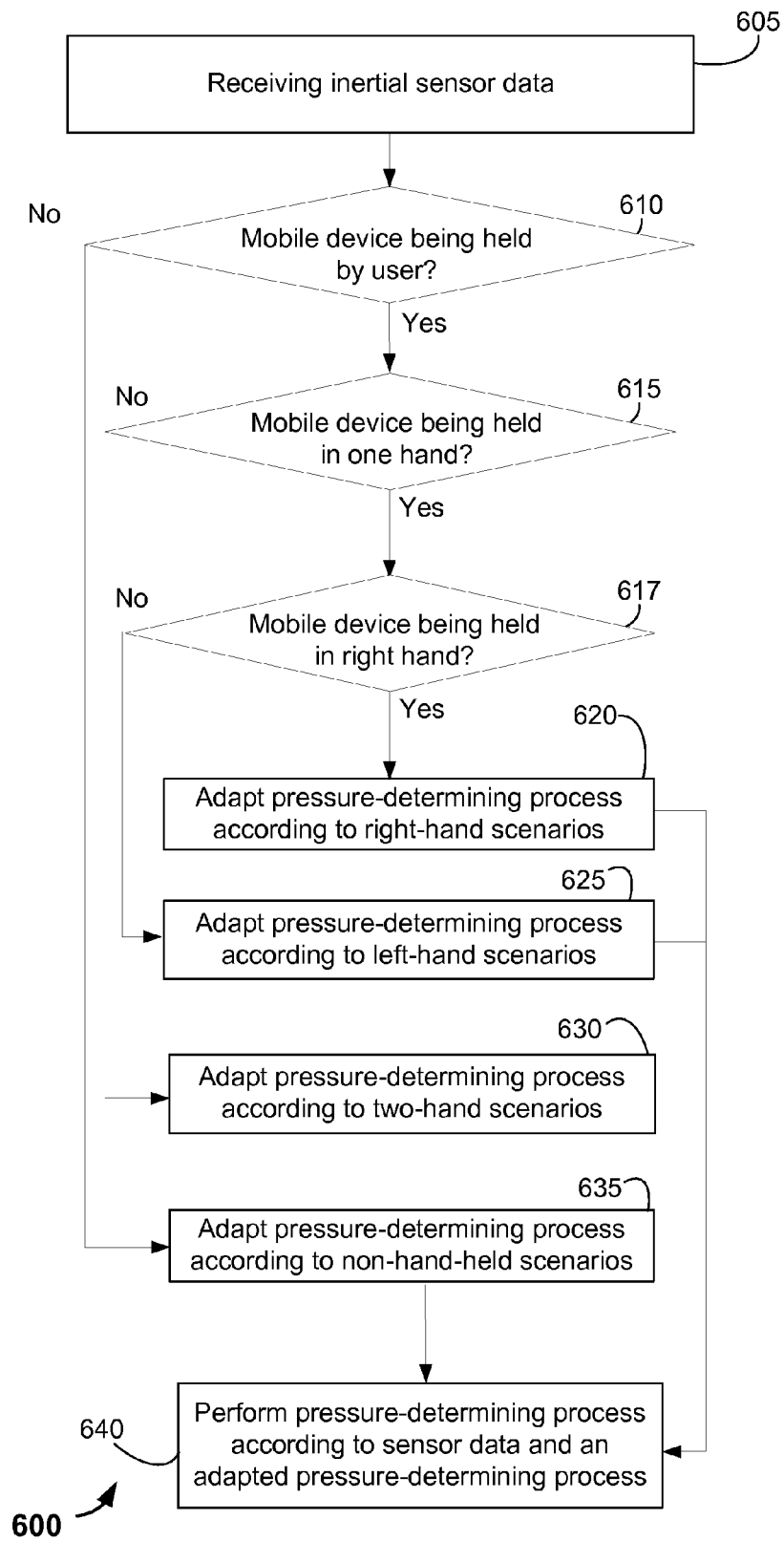
FIG. 6 is a flow diagram that provides example blocks for adapting a pressure determining process according to whether a mobile device is being held in a right hand or a left hand.

FIG. 6 is a flow diagram that provides example blocks for adapting a pressure determining process according to whether a mobile device is being held in a right hand or a left hand. In some implementations, blocks 605-615 may be performed substantially as blocks 405-415 of FIG. 4 are performed. Similarly, blocks 630 and 635 may be performed substantially as blocks 425 and 430 of FIG. 4 are performed.

However, this implementation provides further differentiation of single-hand scenarios. In this example, if it is determined in block 615 that the mobile device is being held in one hand, the process continues to block 617, in which it is determined in which hand the mobile device is being held. In the example shown in FIG. 6, block 617 involves determining whether the mobile device is being held in the user's right hand.

As noted above, touching a mobile device while the mobile device is being held in a right hand may produce characteristic patterns of motion, such as an increase in the magnitude of rotation and/or acceleration of the mobile device in a particular direction around a vertical axis (e.g., in a clockwise direction when viewed from the top side of the mobile device). Accordingly, block 617 may involve determining such characteristic patterns of motion according to sensor data from a sensor system of the mobile device. In some implementations, block 617 may involve analyzing touch screen data to determine whether the location of the user's thumb or other digit(s) may be determined.

If it is determined in block 617 that the mobile device is being held in the user's right hand, the process continues to block 620, which involves adapting a pressure-determining process according to right-hand scenarios. If it is determined in block 617 that the mobile device is not being held in the user's right hand, the process continues to block 625, which involves adapting a pressure-determining process according to left-hand scenarios. In some implementations, blocks 620 and 625 may involve applying modified versions of single-hand scenarios such as described elsewhere herein (e.g., as described above with reference to block 420 of FIG. 4).

For example, block 620 may involve applying single-hand scenarios that are modified to compensate for characteristic patterns of motion caused by touching a mobile device while holding the mobile device in a right hand, whereas block 625 may involve applying single-hand scenarios that are modified to compensate for characteristic patterns of motion caused by touching a mobile device while holding the mobile device in a left hand. In some implementations, the modifications for right-hand scenarios may involve applying a function that decreases values of inertial sensor data that corresponds to touches on the left side of a display and/or that increases values of inertial sensor data that corresponds to touches on the right side of a display. Conversely, the modifications for left-hand scenarios may involve applying a function that increases values of inertial sensor data that corresponds to touches on the left side of a display and/or that decreases values of inertial sensor data that corresponds to touches on the right side of a display. In this example, block 640 involves performing the pressure-determining process according to received sensor data and a pressure-determining process adapted either according to one or more hand-held scenarios or non-hand-held scenarios.

Figure 7:
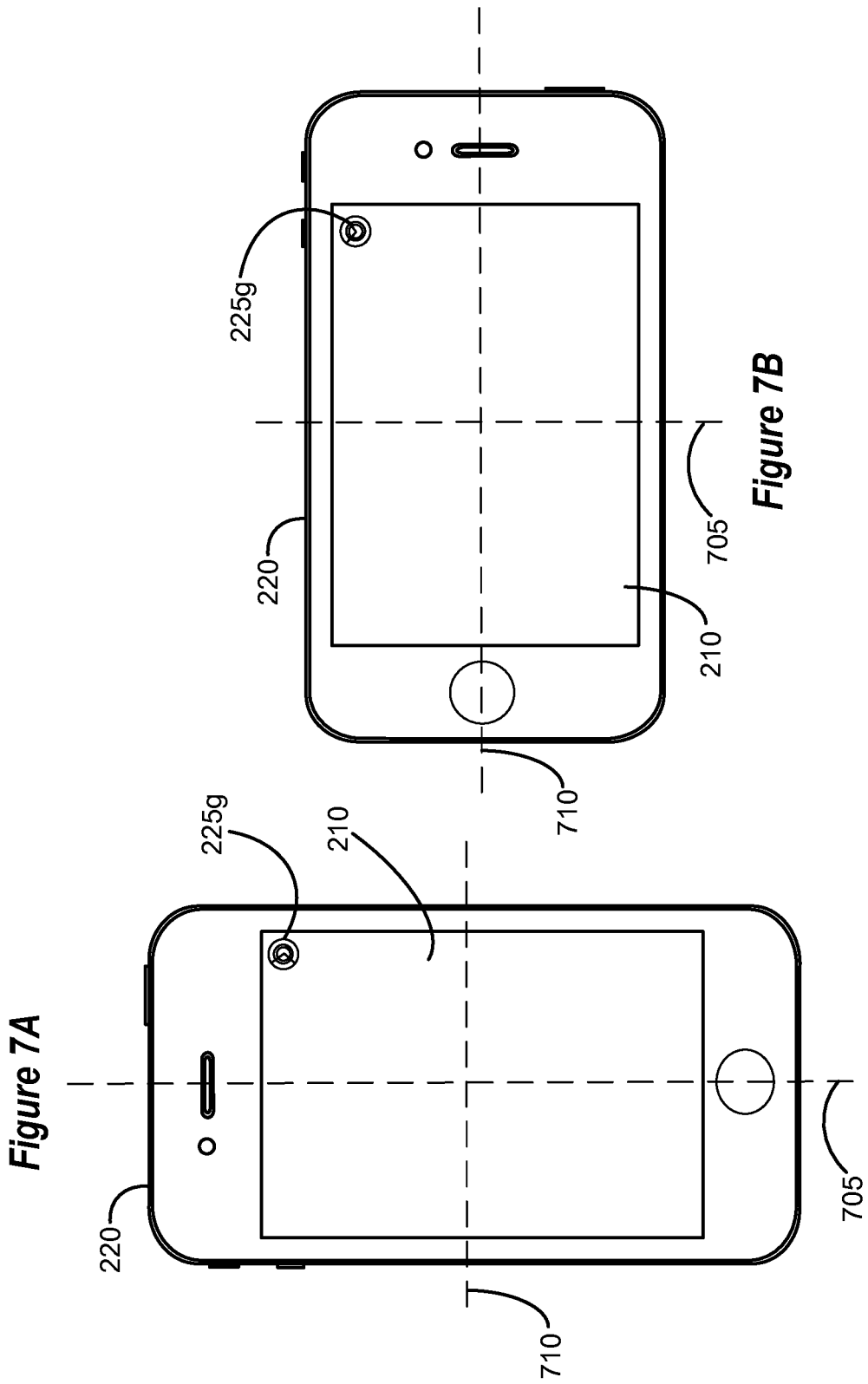
FIGS. 7A and 7B show examples of a mobile device that is being held in different orientations.

FIGS. 7A and 7B show examples of a mobile device that is being held in different orientations. In FIG. 7A, the mobile device 200 is being held in a portrait orientation and in FIG. 7B the mobile device 200 is being held in a landscape orientation. In both examples, the touch target 225g is positioned in an upper right portion of the display 210, with reference to the vertical axis 705 and the horizontal axis 710. However, when the mobile device 200 is being held in a landscape orientation, the touch target 225g is relatively farther from the vertical axis 705 and relatively closer to the horizontal axis 710, as compared to when the mobile device 200 is being held in a portrait orientation. Accordingly, in some implementations adapting a pressure-determining process according to the location of a touch target may be based, at least in part, on the mobile device orientation.

Figure 8:
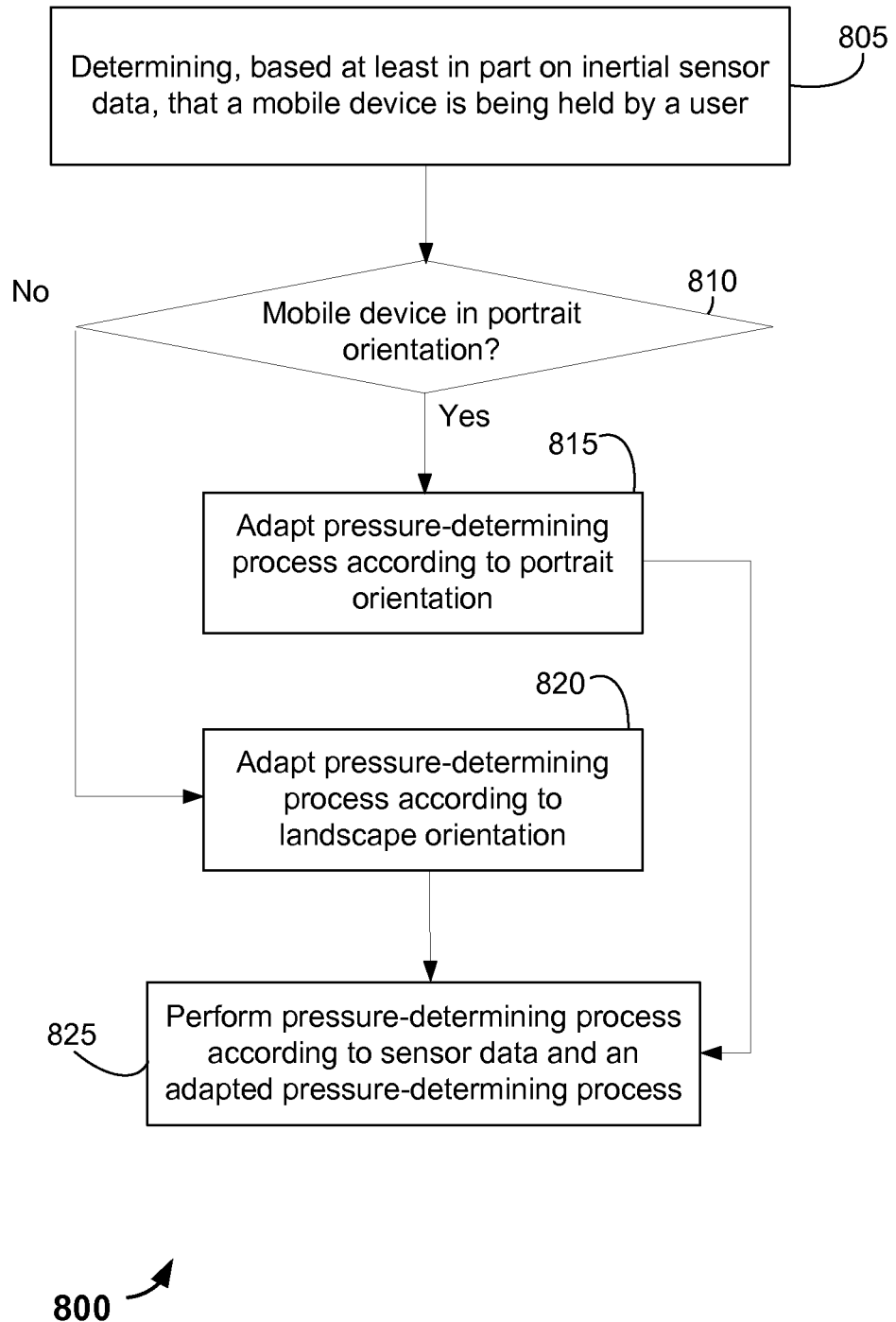
FIG. 8 is a flow diagram that provides example blocks of adapting a pressure-determining process based, at least in part, on mobile device orientation.

FIG. 8 is a flow diagram that provides example blocks of adapting a pressure-determining process based, at least in part, on mobile device orientation. In this example, method 800 begins with block 805, in which it is determined that a mobile device is being held by a user. Here, the determination of block 805 is based, at least in part, on inertial sensor data. Block 805 may be performed in a manner similar to that described above with reference to other figures, e.g., in a manner similar to block 110 of FIG. 1.

Here, block 810 involves determining the orientation of the mobile device. In this example, block 810 involves determining the orientation of the mobile device according to inertial sensor data. The inertial sensor data may, for example, include gyroscope data from an inertial sensor system of the mobile device. If it is determined in block 810 that the mobile device is in a portrait orientation, a pressure-determining process will be adapted according to the portrait orientation in block 815. If it is determined in block 810 that the mobile device is in a landscape orientation, a pressure-determining process will be adapted according to the landscape orientation in block 820.

Adapting the pressure-determining process according to the landscape orientation or the portrait orientation may involve compensating for the location of touch targets on a display of the mobile device. Referring again to FIGS. 7A and 7B, it was noted above that when the mobile device 200 is being held in a landscape orientation, the touch target 225g is relatively farther from the vertical axis 705 and relatively closer to the horizontal axis 710, as compared to when the mobile device 200 is being held in a portrait orientation. Accordingly, when a user touches the touch target 225g when the mobile device is in a landscape orientation, the touch may cause a relatively greater rotation around the vertical axis 705 and a relatively smaller rotation around the horizontal axis 710, as compared to when the mobile device 200 is being held in a portrait orientation. Therefore, blocks 815 and 820 may involve applying a function to compensate for these effects. The function may, for example, be a transform function, a weighting function or a normalization function.

In some examples, method 800 also may involve determining whether the mobile device is being held in a single hand or held in two hands. Method 800 also may involve determining whether the mobile device is being held in a right hand or a left hand. For example, referring again to FIGS. 7A and 7B, if the mobile device 200 were being held in the user's left hand changing the orientation from portrait to landscape, a user's touch on the touch target 225g would tend to cause relatively more rotation and/or acceleration of the mobile device than if the mobile device 200 were being held in the user's right hand. Accordingly, some implementations may involve further adapting a pressure-determining process to compensate not only for the mobile device orientation, but also to compensate for how the mobile device is being held. In this example, block 825 involves performing the pressure-determining process according to received sensor data and a pressure-determining process adapted either according to a portrait orientation or a landscape orientation.

Figure 9:
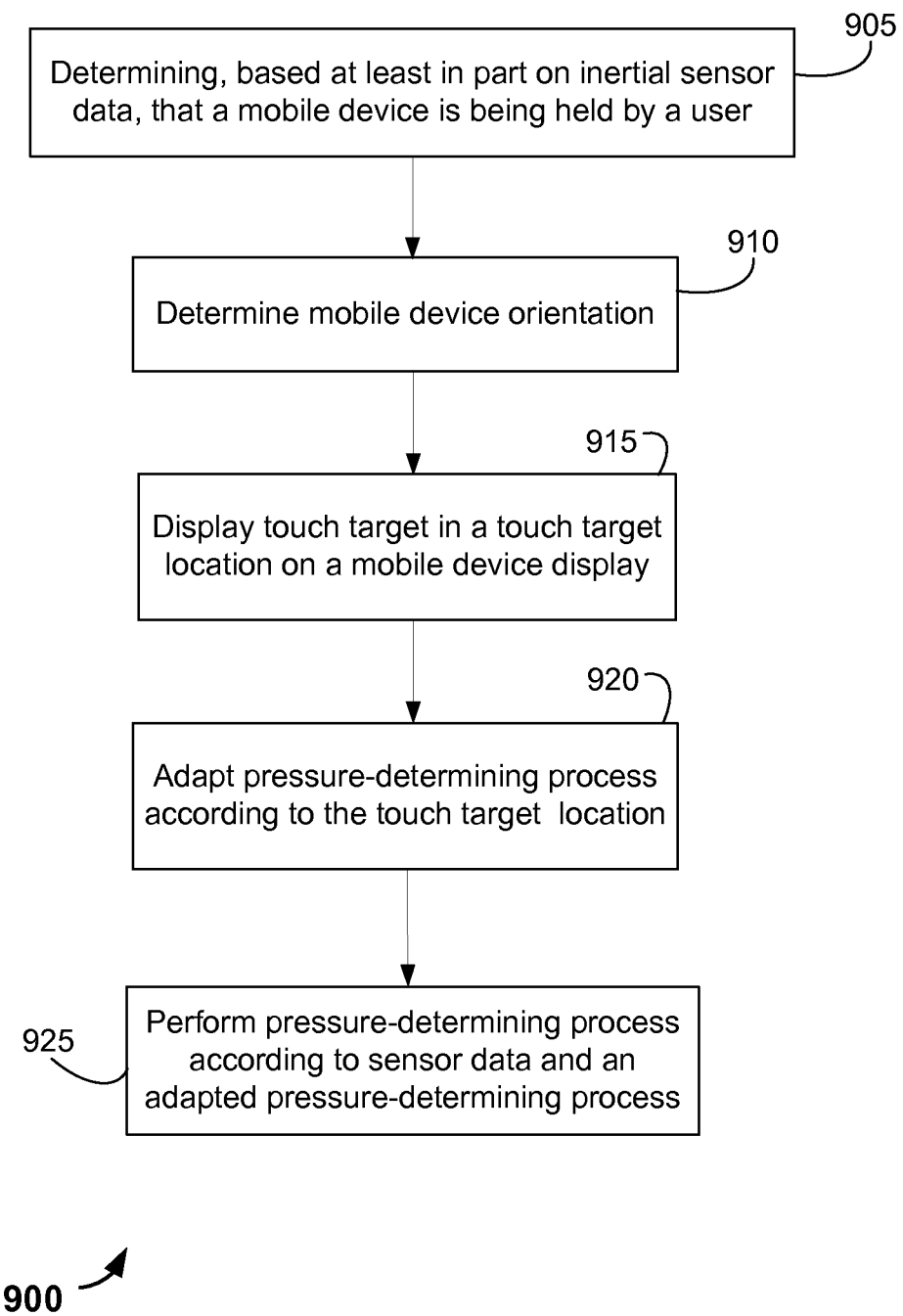
FIG. 9 is a flow diagram that provides another example of adapting a pressure-determining process based, at least in part, on mobile device orientation.

FIG. 9 is a flow diagram that provides another example of adapting a pressure-determining process based, at least in part, on mobile device orientation. In this example, method 900 begins with block 905, in which it is determined that a mobile device is being held by a user. Here, the determination of block 905 is based, at least in part, on inertial sensor data. Block 905 may be performed in a manner similar to that described above with reference to other figures, e.g., in a manner similar to block 110 of FIG. 1.

In block 910, the mobile device orientation is determined. Block 910 may be substantially similar to block 810 of FIG. 8. In this example, block 915 involves displaying a touch target location on a mobile device display. Here, block 920 involves adapting a pressure-determining process according to the touch target location. Referring again to FIGS. 7A and 7B, if a user touches the touch target 225g when the mobile device is in a landscape orientation, the touch may cause a relatively greater rotation around the vertical axis 705 and a relatively smaller rotation around the horizontal axis 710, as compared to when the mobile device 200 is being held in a portrait orientation. Therefore, block 920 may involve applying a function to compensate for these effects. The function may, for example, be a transform function, a weighting function or a normalization function. In this example, block 925 involves performing the pressure-determining process according to received sensor data and a pressure-determining process adapted according to the touch target location.

Some implementations may involve determining user touch patterns. For example, some such implementations may involve monitoring a user's finger taps, presses, etc., to determine sensor data corresponding to "soft presses" and "hard presses" of the user. This information can be used to adapt a pressure-determining process according to the unique touch patterns of an individual user.

In some examples, typical value ranges for "soft press" and "hard press" movements of a particular user may be determined. In some implementations, a hard press "delta" for the user may be determined with reference to a soft press value range, with reference to a threshold value and/or with reference to a range of threshold values. The soft and hard press value ranges may depend, for example, on how or whether the device is being held and on the touch target locations, as noted above. The delta between hard and soft presses, as well as the range of hard and soft press values, may differ from one user to another.

Figure 10:
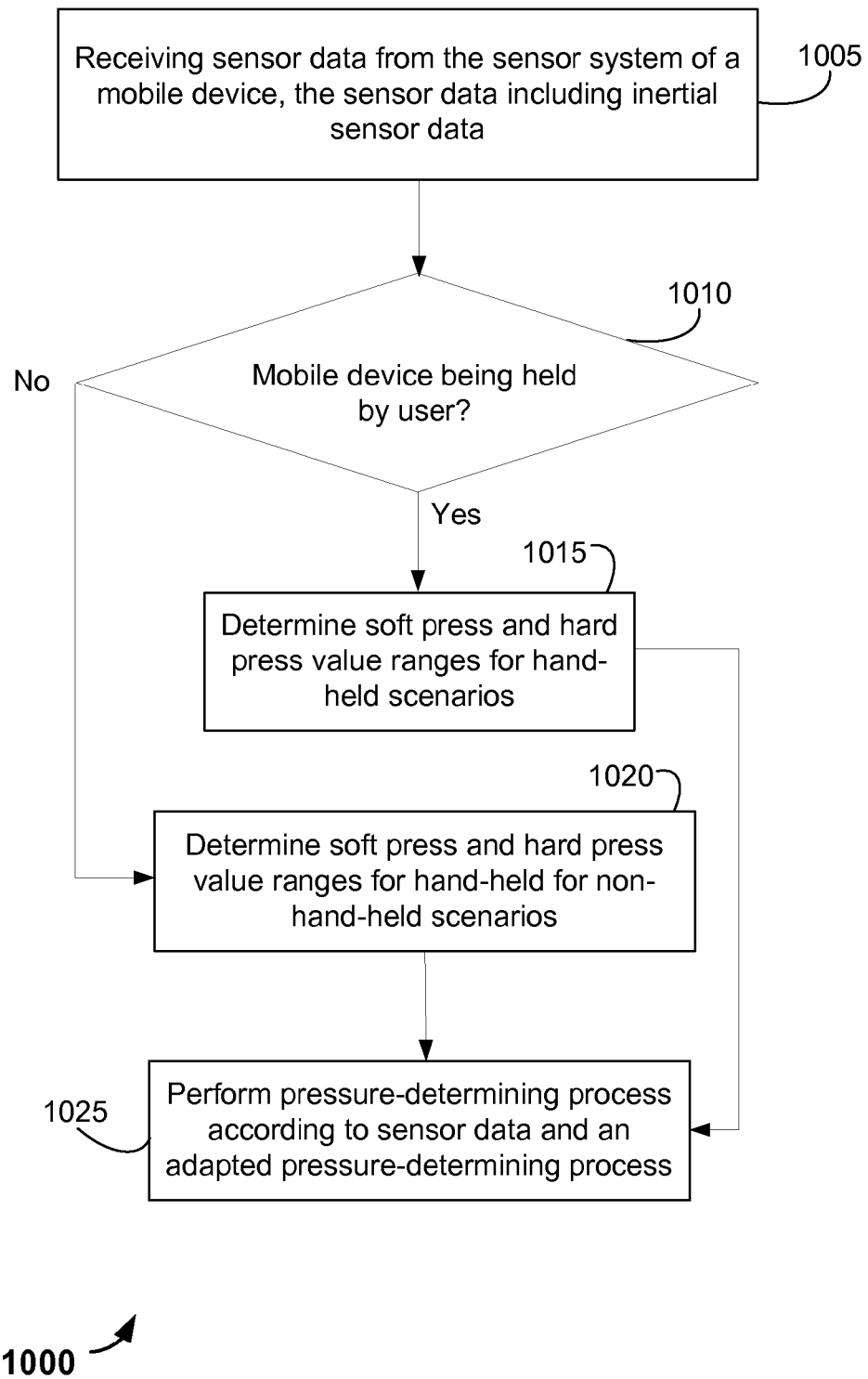
FIG. 10 is a flow diagram that provides an example of determining user touch patterns.

FIG. 10 is a flow diagram that provides an example of determining user touch patterns. In this example, block 1005 involves receiving inertial sensor data from the sensor system of a mobile device. Here, the sensor data includes inertial sensor data. In block 1010, it is determined, based at least in part on the sensor data, whether the mobile device is being held by a user. Accordingly, blocks 1005 and 1010 may be substantially similar to blocks 105 and 110 of FIG. 1.

However, in this example, if it is determined in block 1010 that the mobile device is being held by the user, the process continues to block 1015. Block 1015 involves determining soft press and hard press value ranges for hand-held scenarios. Here, if it is determined in block 1010 that the mobile device is not being held by the user, the process continues to block 1020, which involves determining soft press and hard press value ranges for non-hand-held scenarios. The soft press and hard press value ranges may, for example, correspond to ranges of inertial sensor values, ranges of audio data amplitudes, etc. In this example, block 1025 involves performing the pressure-determining process according to received sensor data and an adapted pressure-determining process.

As noted above, if the mobile device has a flat back and is resting on a stable surface, the inertial sensor data responsive to user touches may be relatively low-amplitude. Accordingly, the soft press and hard press values for non-hand-held scenarios may tend to be relatively smaller than the soft press and hard press values for hand-held scenarios. The soft press and hard press value ranges may be stored locally, in a memory of the mobile device, and/or may be transmitted to another device (such as a server) and stored in a memory of the other device.

As noted above, if a mobile device is resting on a stable surface, such as a table top, inertial sensors may not yield much useful information regarding a level of pressure exerted by a user on a mobile device. Accordingly, when it is determined that a mobile device is not being held by the user, some implementations may involve causing the mobile device to prompt the user to pick up the mobile device. For example, if an application running on the mobile device involves receiving input from pressure-sensitive buttons (such as buttons for use in a game) and the accelerometer and/or gyroscope data suggest that the device is not being held in the hand (e.g., because it is resting on a table), then the user may be prompted to hold the mobile device in order to exploit the enhanced pressure-determining capabilities of hand-held scenarios.

Figure 11:
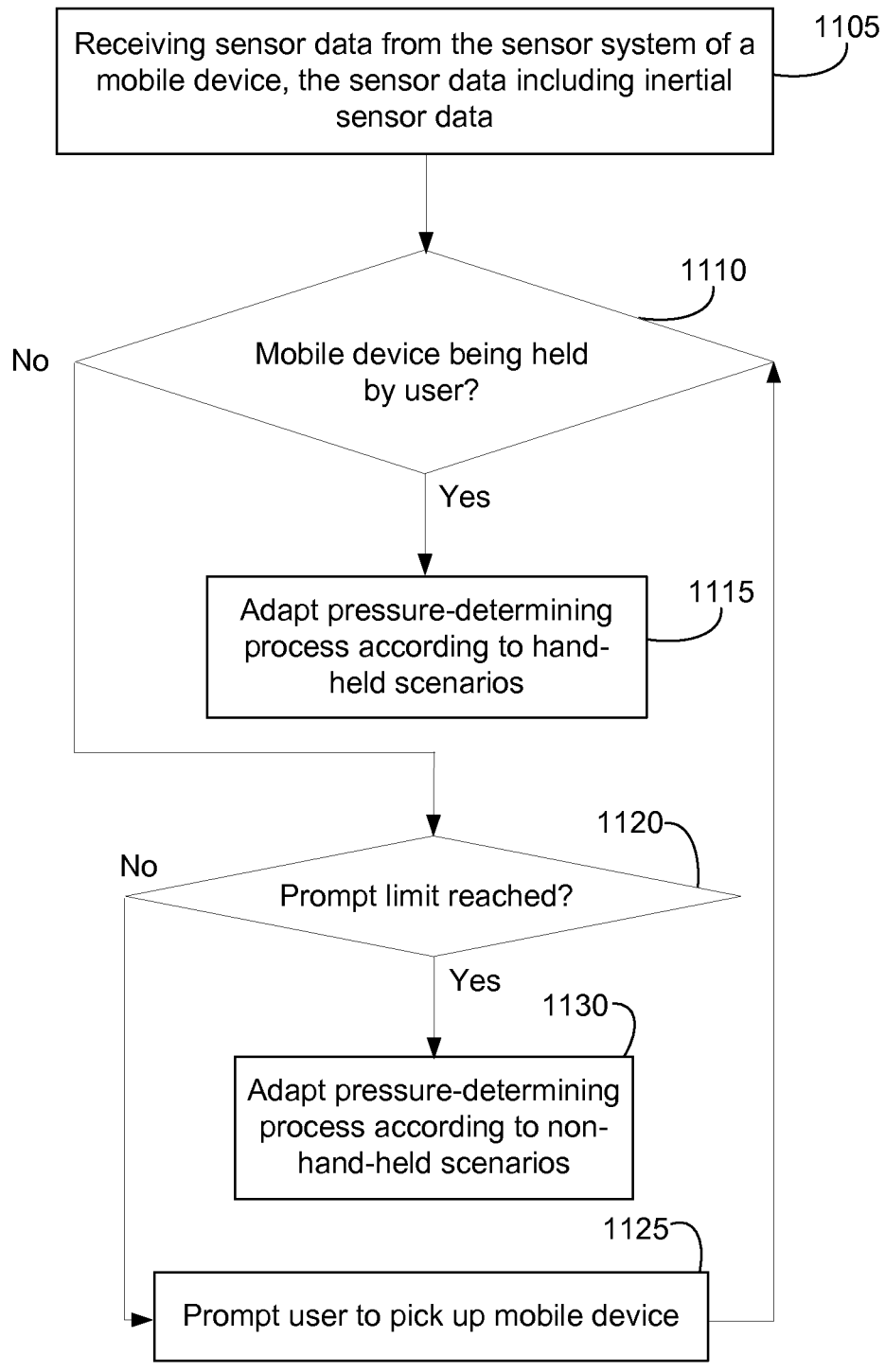
FIG. 11 is a flow diagram that provides an example of an alternative pressure-determining method.

FIG. 11 is a flow diagram that provides an example of an alternative pressure-determining method. Blocks 1105, 1110 and 1115 may be substantially similar to blocks 1005, 1010 and 1015. However, in this example, if it is determined in block 1110 that the mobile device is not being held by the user, the user may be prompted to hold the mobile device. In this example, the user will be prompted only a predetermined number of times. Accordingly, before prompting the user, it is determined in block 1120 whether a user prompt limit has been reached. If not, the user is prompted to pick up the mobile device in block 1125. The prompt may be an audio prompt and/or a visual prompt, provided by the mobile device.

After the user has been prompted to pick up the device, the process reverts to block 1110, wherein it is once again determined whether the user is holding the mobile device. If so, the pressure-determining process may be adapted according to one or more hand-held scenarios in block 1115. If not, the process continues to block 1120. If the user does not pick up the mobile device before the prompt limit has been reached, the process continues to block 1130, which involves adapting the pressure-determining process according to non-hand-held scenarios.

Figure 12B:
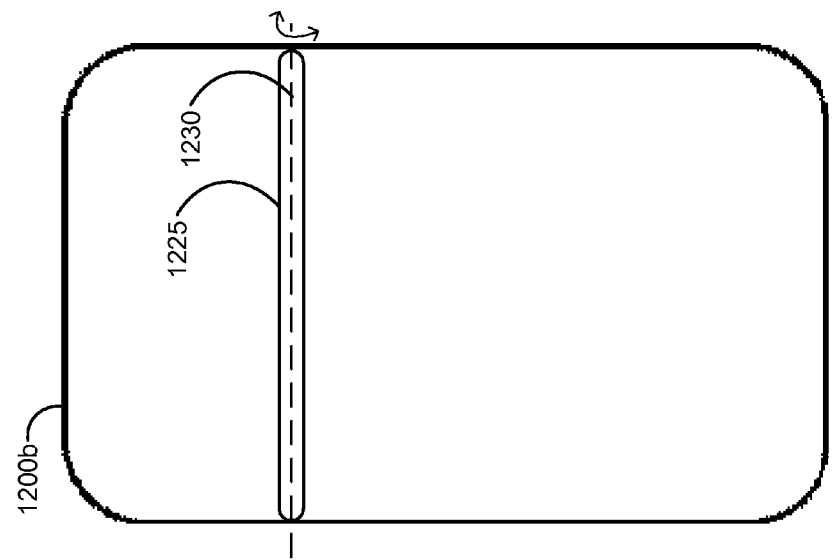
FIGS. 12A and 12B show examples of the backs of mobile device cases.
Figure 12A:
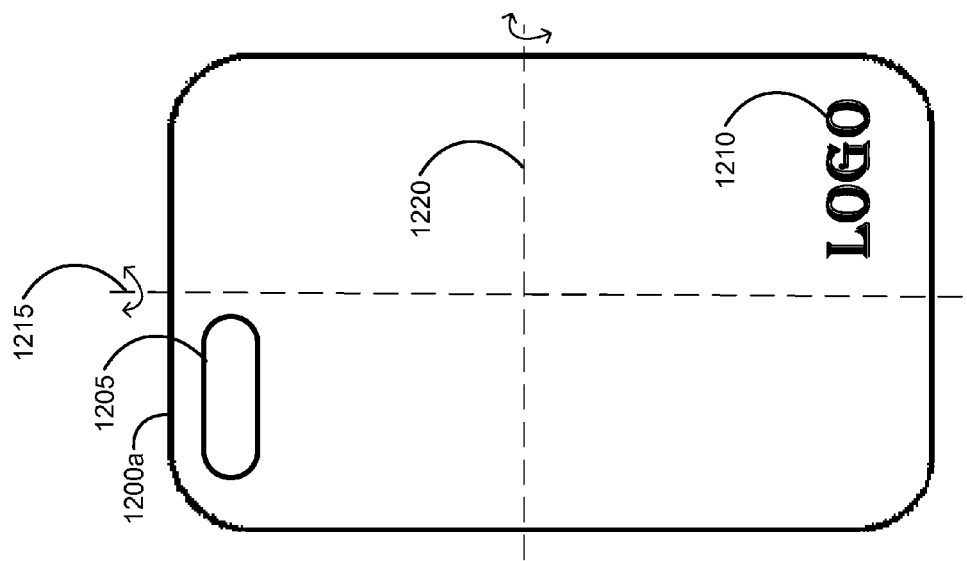

FIGS. 12A and 12B show examples of the backs of mobile device cases. In the example shown in FIG. 12A, the back of mobile device case 1200a includes an aperture 1205 for a mobile device camera and a logo 1210. In this example, the logo 1210 is formed of raised letters that protrude slightly from the back of the mobile device case 1200a. Even when a mobile device having such a case is resting on a stable surface, the aperture 1205 and the logo 1210 cause a certain degree of instability and characteristic movements that correspond with these structures. For example, touches in certain areas of the mobile device may produce some degree of rotation around the vertical axis 1215 and/or the horizontal axis 1220.

In the example shown in FIG. 12B, the back of mobile device case 1200b includes a slight protrusion in the shape of a ridge. Even when a mobile device having such a case is resting on a stable surface, touches in certain areas of the mobile device (e.g., hard touches in the upper portion of the mobile device) may produce characteristic movements, such as some degree of rotation around the axis 1230.

Accordingly, some implementations disclosed herein may involve adapting a pressure-determining process based, at least in part, on a characteristic movement corresponding with one or more structures of a mobile device or a one or more structures of a mobile device case. In some examples, the structures may include a bezel, a ridge, a support and/or an aperture.

Figure 13:
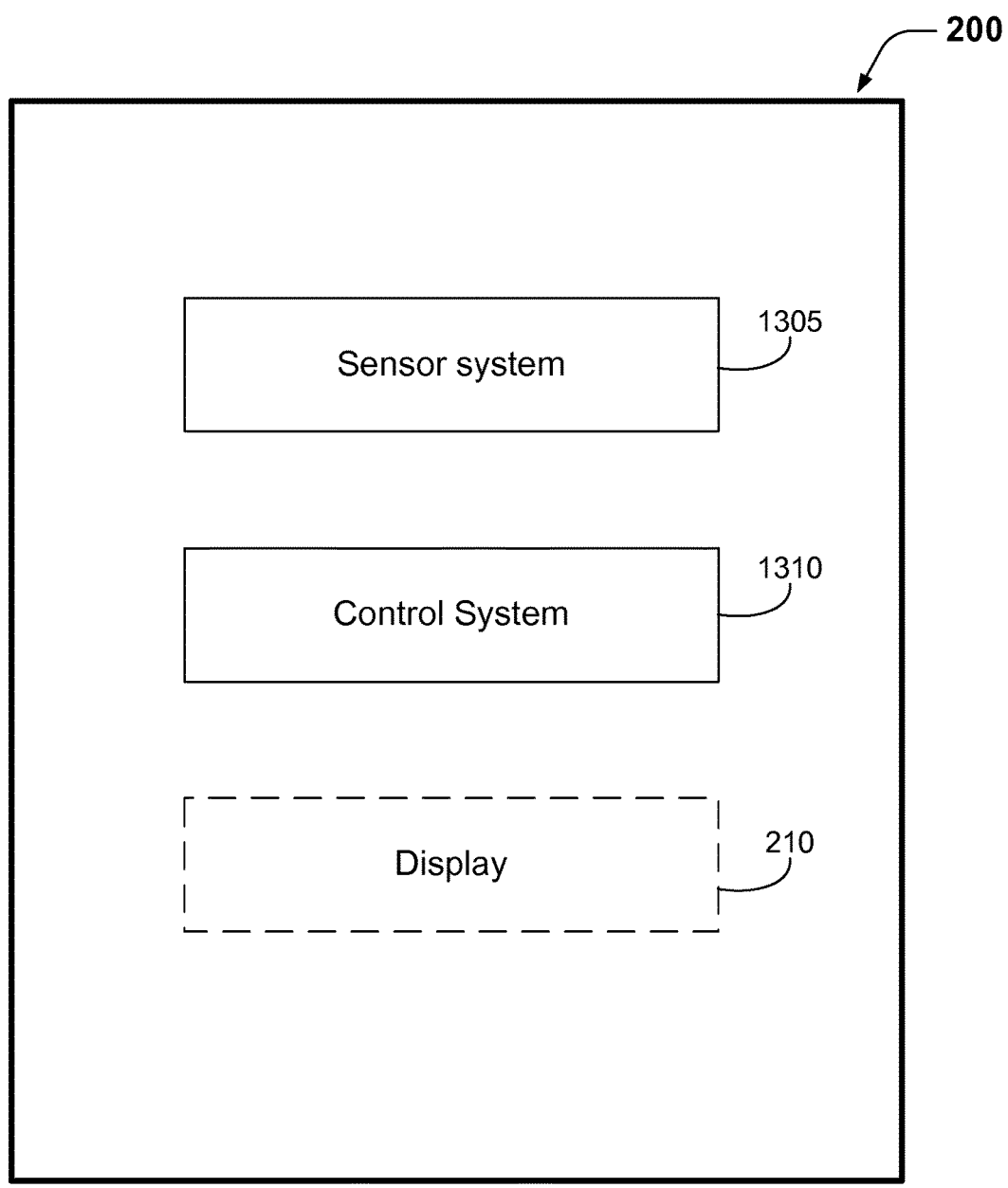
FIG. 13 is a block diagram that shows example elements of a mobile device.

FIG. 13 is a block diagram that shows example elements of a mobile device. In this example, the mobile device 200 includes a sensor system 1305 and a control system 1310. The sensor system 1305 may include one or more gyroscopes, accelerometers, microphones, etc. The control system 1310 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 1310 also may include (and/or be configured for communication with) one or more memory devices, such as one or more random access memory (RAM) devices, read-only memory (ROM) devices, etc.

The control system 1310 may be capable of performing, at least in part, the methods disclosed herein. For example, the control system 1310 may be capable of receiving sensor data, including inertial sensor data, from the sensor system 1305. The control system 1310 may be capable of determining, based on the sensor data, whether the mobile device is being held by a user. The control system 1310 may be capable of adapting a pressure-determining process of determining a level of pressure exerted by the user on the mobile device. The adapting may be based, at least in part, on whether the mobile device is being held by the user. The control system 1310 may be capable of performing the pressure-determining process according to the sensor data.

In some implementations, the sensor data may include audio data from a microphone of the sensor system 1305 and the determination of the level of pressure may be based, at least in part, on the audio data. Adapting the pressure-determining process may involve applying at least one weighting factor to the audio data, to the inertial sensor data or to both the audio data and the inertial sensor data.

Optionally, the mobile device 200 may include other components, such as the display 210, a touch sensor system (not shown), etc. The display 210 may be any suitable type of display, such as the types of display 1330 described below with reference to FIGS. 14A and 14B. The control system 1310 may be capable of displaying a touch target in a location of the display. The control system 1310 may be capable of adapting the pressure-determining process according to the location of the touch target on the display.

According to some implementations, the control system 1310 may be capable of determining a mobile device orientation. Adapting the pressure-determining process according to the location of the touch target may be based, at least in part, on the mobile device orientation.

In some implementations, the control system 1310 may be capable of determining user touch patterns. The control system 1310 may be capable of adapting the pressure-determining process based, at least in part, on the user touch patterns.

According to some implementations, the control system 1310 may be capable of determining whether the mobile device 200 is being held by a single hand or by two hands. The control system 1310 may be capable of adapting the pressure-determining process based, at least in part, on whether the mobile device is being held by a single hand or by two hands.

If the control system 1310 determines that the mobile device 200 is not being held by the user, the control system 1310 may be capable of causing the mobile device to prompt the user to pick up the mobile device.

Figure 14A:
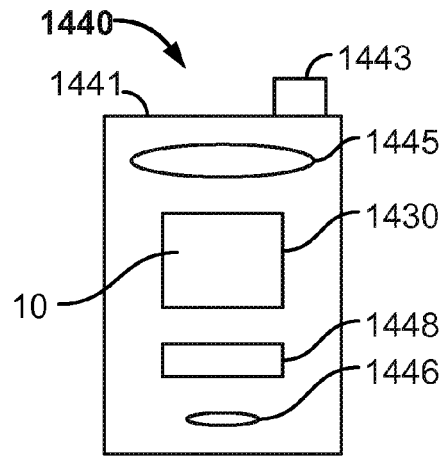
FIGS. 14A and 14B show examples of system block diagrams illustrating example components of a mobile device, which is a display device in this example.
Figure 14B:
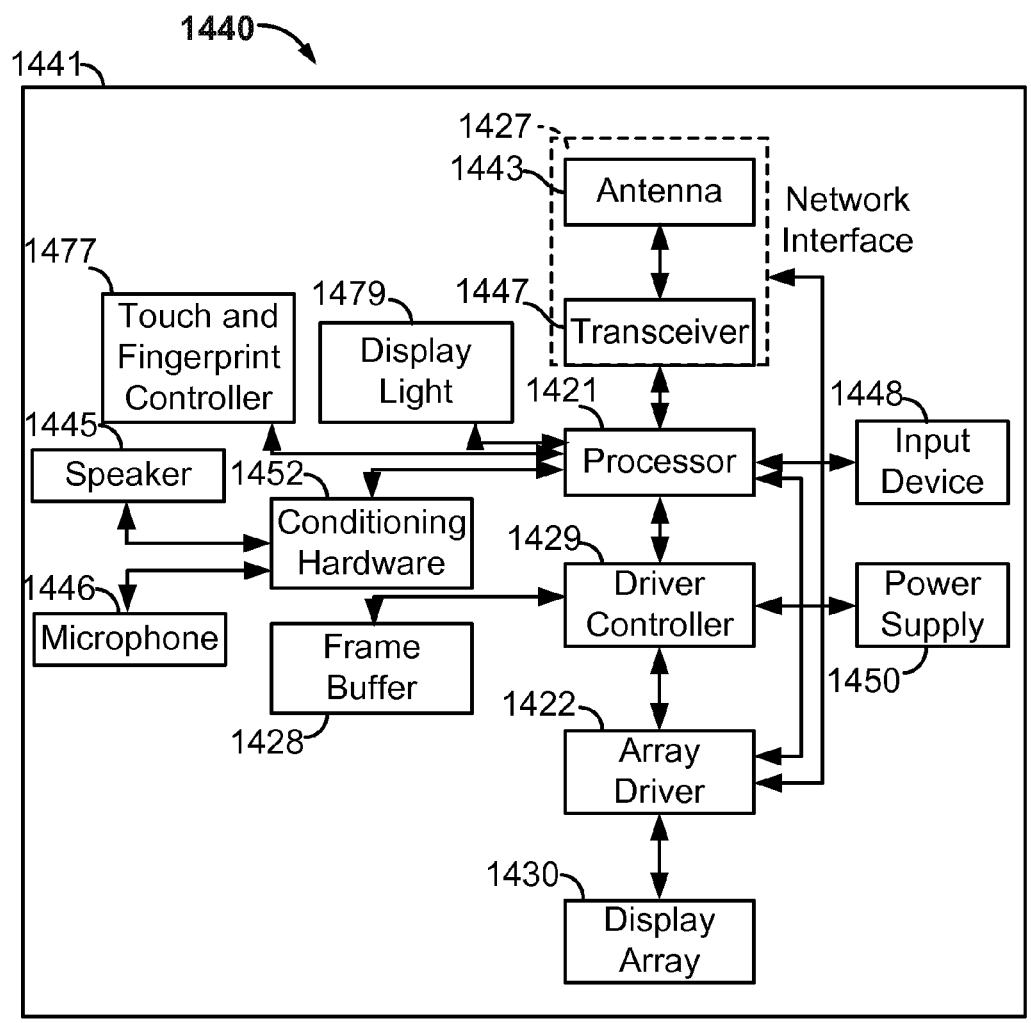

FIGS. 14A and 14B show examples of system block diagrams illustrating example components of a mobile device, which is a display device in this example. The display device 1440 may be, for example, mobile display device such as a smart phone, a cellular or mobile telephone, etc. However, the same components of the display device 1440 or slight variations thereof are also illustrative of various types of display devices such as televisions, computers, tablets, e-readers, hand-held devices and portable media devices.

In this example, the display device 1440 includes a housing 1441, a display 1430, a touch sensing system 10, an antenna 1443, a speaker 1445, an input device 1448 and a microphone 1446. The housing 1441 may be formed from any of a variety of manufacturing processes, including injection molding, and vacuum forming. In addition, the housing 1441 may be made from any of a variety of materials, including, but not limited to: plastic, metal, glass, rubber and ceramic, or a combination thereof. The housing 1441 may include removable portions (not shown) that may be interchanged with other removable portions of different color, or containing different logos, pictures, or symbols.

The display 1430 may be any of a variety of displays, including a flat-panel display, such as plasma, organic light-emitting diode (OLED) or liquid crystal display (LCD), or a non-flat-panel display, such as a cathode ray tube (CRT) or other tube device. In addition, the display 1430 may include an interferometric modulator (IMOD)-based display or a micro-shutter based display.

The components of one example of the display device 1440 are schematically illustrated in FIG. 14B. Here, the display device 1440 includes a housing 1441 and may include additional components at least partially enclosed therein. For example, the display device 1440 includes a network interface 1427 that includes an antenna 1443 which may be coupled to a transceiver 1447. The network interface 1427 may be a source for image data that could be displayed on the display device 1440. Accordingly, the network interface 1427 is one example of an image source module, but the processor 1421 and the input device 1448 also may serve as an image source module. The transceiver 1447 is connected to a processor 1421, which is connected to conditioning hardware 1452. The conditioning hardware 1452 may be capable of conditioning a signal (such as applying a filter or otherwise manipulating a signal). The conditioning hardware 1452 may be connected to a speaker 1445 and a microphone 1446. The processor 1421 also may be connected to an input device 1448 and a driver controller 1429. The driver controller 1429 may be coupled to a frame buffer 1428, and to an array driver 1422, which in turn may be coupled to a display array 1430. One or more elements in the display device 1440, including elements not specifically depicted in FIG. 14B, may be capable of functioning as a memory device and be capable of communicating with the processor 1421 or other components of a control system. In some implementations, a power supply 1450 may provide power to substantially all components in the particular display device 1440 design.

In this example, the display device 1440 also includes a touch controller 1477. The touch controller 1477 may, for example, be a part of a control system 1310 such as that described above. Accordingly, in some implementations the touch controller 1477 (and/or other components of the control system 1310) may include one or more memory devices. In some implementations, the control system 1310 also may include components such as the processor 1421, the array driver 1422 and/or the driver controller 1429 shown in FIG. 14B. The touch controller 1477 may be capable of communicating with elements of the touch sensing system 10 (e.g., with elements of a touch screen), for example by routing wires, and may be capable of controlling the touch sensing system 10. The touch controller 1477 may be capable of determining a location and/or movement of one or more objects, such as fingers, on or proximate the touch sensing system 10. In alternative implementations, however, the processor 1421 (or another part of the control system 1310) may be capable of providing some or all of this functionality.

The touch controller 1477 (and/or another element of the control system 50) may be capable of providing input for controlling the display device 1440 according to one or more touch locations. In some implementations, the touch controller 1477 may be capable of determining movements of one or more touch locations and of providing input for controlling the display device 1440 according to the movements. Alternatively, or additionally, the touch controller 1477 may be capable of determining locations and/or movements of objects that are proximate the display device 1440. Accordingly, in some implementations the touch controller 1477 may be capable of detecting finger or stylus movements, hand gestures, etc., even if no contact is made with the display device 1440. The touch controller 1477 may be capable of providing input for controlling the display device 1440 according to such detected movements and/or gestures.

The network interface 1427 includes the antenna 1443 and the transceiver 1447 so that the display device 1440 may communicate with one or more devices over a network. The network interface 1427 also may have some processing capabilities to relieve, for example, data processing requirements of the processor 1421. The antenna 1443 may transmit and receive signals. In some implementations, the antenna 1443 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 1443 transmits and receives RF signals according to the Bluetooth® standard. In the case of a cellular telephone, the antenna 1443 may be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 1447 may pre-process the signals received from the antenna 1443 so that they may be received by and further manipulated by the processor 1421. The transceiver 1447 also may process signals received from the processor 1421 so that they may be transmitted from the display device 1440 via the antenna 1443.

In some implementations, the transceiver 1447 may be replaced by a receiver. In addition, in some implementations, the network interface 1427 may be replaced by an image source, which may store or generate image data to be sent to the processor 1421. The processor 1421 may control the overall operation of the display device 1440. The processor 1421 receives data, such as compressed image data from the network interface 1427 or an image source, and processes the data into raw image data or into a format that may be readily processed into raw image data. The processor 1421 may send the processed data to the driver controller 1429 or to the frame buffer 1428 for storage. Raw data typically refers to the information that identifies the image characteristics at each location within an image. For example, such image characteristics may include color, saturation and gray-scale level.

The processor 1421 may include a microcontroller, CPU, or logic unit to control operation of the display device 1440. The conditioning hardware 1452 may include amplifiers and filters for transmitting signals to the speaker 1445, and for receiving signals from the microphone 1446. The conditioning hardware 1452 may be discrete components within the display device 1440, or may be incorporated within the processor 1421 or other components.

The driver controller 1429 may take the raw image data generated by the processor 1421 either directly from the processor 1421 or from the frame buffer 1428 and may re-format the raw image data appropriately for high speed transmission to the array driver 1422. In some implementations, the driver controller 1429 may re-format the raw image data into a data flow having a raster-like format, such that it has a time order suitable for scanning across the display array 1430. Then the driver controller 1429 sends the formatted information to the array driver 1422. Although a driver controller 1429, such as an LCD controller, is often associated with the system processor 1421 as a stand-alone Integrated Circuit (IC), such controllers may be implemented in many ways. For example, controllers may be embedded in the processor 1421 as hardware, embedded in the processor 1421 as software, or fully integrated in hardware with the array driver 1422.

The array driver 1422 may receive the formatted information from the driver controller 1429 and may re-format the video data into a parallel set of waveforms that are applied many times per second to the hundreds, and sometimes thousands (or more), of leads coming from the display's x-y matrix of display elements.

In some implementations, the driver controller 1429, the array driver 1422, and the display array 1430 are appropriate for any of the types of displays described herein. For example, the driver controller 1429 may be a conventional display controller or a bi-stable display controller (such as an IMOD display element controller). Additionally, the array driver 1422 may be a conventional driver or a bi-stable display driver. Moreover, the display array 1430 may be a conventional display array or a bi-stable display. In some implementations, the driver controller 1429 may be integrated with the array driver 1422. Such an implementation may be useful in highly integrated systems, for example, mobile phones, portable-electronic devices, watches or small-area displays.

In some implementations, the input device 1448 may be capable of allowing, for example, a user to control the operation of the display device 1440. The input device 1448 may include a keypad, such as a QWERTY keyboard or a telephone keypad, a button, a switch, a rocker, a touch-sensitive screen, a touch-sensitive screen integrated with the display array 1430, or a pressure- or heat-sensitive membrane. The microphone 1446 may be capable of functioning as an input device for the display device 1440. In some implementations, voice commands through the microphone 1446 may be used for controlling operations of the display device 1440.

The power supply 1450 may include a variety of energy storage devices. For example, the power supply 1450 may be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery may be wirelessly chargeable. The power supply 1450 also may be a renewable energy source, a capacitor, or a solar cell, including a plastic solar cell or solar-cell paint. The power supply 1450 also may be capable of receiving power from a wall outlet.

In some implementations, control programmability resides in the driver controller 1429 which may be located in several places in the electronic display system. In some other implementations, control programmability resides in the array driver 1422. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A method of adapting a pressure-determining process according to input from one or more sensors of a mobile device, the method comprising:
   receiving sensor data from the one or more sensors of the mobile device, the sensor data including inertial sensor data;
   determining, based on the inertial sensor data, whether the mobile device is being held by a user;
   adapting a pressure-determining process for determining a level of pressure exerted by the user on the mobile device, the adapting being based, at least in part, on whether the mobile device is being held by the user;
   performing the pressure-determining process according to the sensor data and the adapted pressure-determining process; and, based on determining that the mobile device is being held by the user, displaying a touch target in a touch target location of a mobile device display and adapting the pressure-determining process according to user input received at the touch target location.

2. The method of claim 1, wherein the sensor data includes audio data from a microphone and wherein the pressure-determining process is based, at least in part, on the audio data.

3. The method of claim 2, wherein the audio data includes voice data and finger tap data, further comprising applying a scheduling mechanism for the voice data and the finger tap data.

4. The method of claim 1, wherein adapting the pressure-determining process involves applying at least one weighting factor to the sensor data from the one or more sensors.

5. The method of claim 4, wherein the sensor data includes audio data from a microphone, further comprising determining an ambient noise level, wherein the at least one weighting factor is based, at least in part, on the ambient noise level.

6. The method of claim 1, further comprising determining a mobile device orientation, wherein adapting the pressure-determining process is based, at least in part, on the mobile device orientation.

7. The method of claim 6, further comprising:
   determining whether the mobile device is in a portrait or a landscape orientation; and
   adapting the pressure-determining process based, at least in part, on whether the mobile device is in the portrait or the landscape orientation.

8. The method of claim 1, further comprising determining user touch patterns, wherein adapting the pressure-determining process is based, at least in part, on the user touch patterns.

9. The method of claim 8, wherein determining the user touch patterns involves determining soft press and hard press value ranges for the user.

10. The method of claim 9 further comprising:
    determining first value ranges when the mobile device is being held by the user; and
    determining second value ranges when the mobile device is not being held by the user.

11. The method of claim 1, wherein it is determined that the mobile device is being held by the user, further comprising determining how the mobile device is being held, wherein adapting the pressure-determining process is based, at least in part, on how the mobile device is being held.

12. The method of claim 1, wherein it is determined that the mobile device is not being held by the user, wherein adapting the pressure-determining process is based, at least in part, on a characteristic movement corresponding with a structure of the mobile device or a structure of a mobile device case.

13. The method of claim 1, wherein the mobile device includes a touch sensor system and wherein determining whether the mobile device is being held by the user is based, at least in part, on input from the touch sensor system.

14. The method of claim 1, wherein it is determined that the mobile device is not being held by the user, further comprising causing the mobile device to prompt the user to pick up the mobile device.

15. A non-transitory medium having software stored thereon, the software including instructions for processing sensor data from a sensor system of a mobile device by:
    receiving sensor data from the sensor system of the mobile device, the sensor data including inertial sensor data;
    determining, based on the inertial sensor data, whether the mobile device is being held by a user;
    adapting a pressure-determining process for determining a level of pressure exerted by the user on the mobile device, the adapting being based, at least in part, on whether the mobile device is being held by the user;
    performing the pressure-determining process according to the sensor data and the adapted pressure-determining process; and, based on determining that the mobile device is being held by the user, displaying a touch target in a touch target location of a mobile device display and adapting the pressure-determining process according to user input received at the touch target location.

16. The non-transitory medium of claim 15, wherein the sensor data includes audio data from a microphone and wherein adapting the pressure-determining process involves applying at least one weighting factor to the audio data, to the inertial sensor data or to both the audio data and the inertial sensor data.

17. The non-transitory medium of claim 15, wherein the software includes instructions for determining a mobile device orientation and wherein adapting the pressure-determining process is based, at least in part, on the mobile device orientation.

18. A mobile device, comprising:
a sensor system comprising a plurality of sensors, including at least one inertial sensor;
a display; and
control means for:
receiving sensor data from the one or more sensors of the mobile device, the sensor data including inertial sensor data;
determining, based on the inertial sensor data, whether the mobile device is being held by a user;
adapting a pressure-determining process for determining a level of pressure exerted by the user on the mobile device, the adapting being based, at least in part, on whether the mobile device is being held by the user;
performing the pressure-determining process according to the sensor data and the adapted pressure-determining process; and, based on determining that the mobile device is being held by the user, displaying a touch target in a touch target location of the display and adapting the pressure-determining process according to user input received at the touch target location.

19. The mobile device of claim 18, wherein the sensor data includes audio data from a microphone and wherein the control means for adapting the pressure-determining process includes means for applying at least one weighting factor to the audio data, to the inertial sensor data or to both the audio data and the inertial sensor data.

20. A mobile device, comprising:
a sensor system comprising a touch sensor system and a plurality of sensors, including at least one inertial sensor;
a display; and
a control system configured to:
receive sensor data from the sensor system, the sensor data including inertial sensor data;
determine, based on the inertial sensor data, whether the mobile device is being held by a user;
display a touch target in a location of the display;
determine, according to input from the touch sensor system, that a user has touched the touch target
adapt a pressure-determining process of determining a level of pressure exerted by the user on the mobile device, the adapting being based, at least in part, on whether the mobile device is being held by the user and on the location of the touch target on the display; and
perform the pressure-determining process according to the sensor data and the adapted pressure-determining process.

21. The mobile device of claim 20, wherein the sensor system includes a microphone, wherein the sensor data includes audio data from the microphone and wherein the pressure-determining process is based, at least in part, on the audio data.

22. The mobile device of claim 21, wherein adapting the pressure-determining process involves applying at least one weighting factor to the audio data, to the inertial sensor data or to both the audio data and the inertial sensor data.

23. The mobile device of claim 20, wherein the control system is further configured to determine a mobile device orientation and wherein adapting the pressure-determining process is based, at least in part, on the mobile device orientation.

24. The mobile device of claim 20, wherein the control system is further configured to determine user touch patterns, wherein adapting the pressure-determining process is based, at least in part, on the user touch patterns.

25. The mobile device of claim 20, wherein the control system determines that the mobile device is being held by the user, wherein the control system is further configured to determine how the mobile device is being held and wherein adapting the pressure-determining process is based, at least in part, on how the mobile device is being held.

26. The mobile device of claim 20, wherein it is determined that the mobile device is not being held by the user, wherein the control system is further configured to cause the mobile device to prompt the user to pick up the mobile device.

* * * * *